United States Patent
Nanami

(10) Patent No.: US 8,219,252 B2
(45) Date of Patent: Jul. 10, 2012

(54) CENTRAL AIR-CONDITIONING SYSTEM

(75) Inventor: Tomoyuki Nanami, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 236 days.

(21) Appl. No.: 12/727,645

(22) Filed: Mar. 19, 2010

(65) Prior Publication Data

US 2011/0130881 A1     Jun. 2, 2011

(30) Foreign Application Priority Data

Dec. 1, 2009    (JP) .................................. 2009-273382

(51) Int. Cl.
- G01M 1/38    (2006.01)
- G05B 13/00   (2006.01)
- G05B 15/00   (2006.01)
- G05D 23/00   (2006.01)
- F24F 3/00    (2006.01)
- F25B 29/00   (2006.01)

(52) U.S. Cl. ........ 700/278; 700/276; 700/277; 165/209; 165/212; 165/257

(58) Field of Classification Search ......... 700/276–278; 165/209, 212, 257
See application file for complete search history.

(56) References Cited

U.S. PATENT DOCUMENTS

| | | | | |
|---|---|---|---|---|
| 7,156,316 B2* | 1/2007 | Kates | ............................ | 236/1 B |
| 7,761,186 B2* | 7/2010 | Keller et al. | .................. | 700/277 |
| 2002/0134849 A1* | 9/2002 | Disser | ............................ | 236/47 |
| 2004/0267385 A1* | 12/2004 | Lingemann | ..................... | 700/83 |
| 2008/0277486 A1* | 11/2008 | Seem et al. | ................... | 236/49.3 |
| 2009/0149973 A1* | 6/2009 | Keller et al. | ..................... | 700/90 |
| 2009/0240380 A1* | 9/2009 | Shah et al. | ..................... | 700/295 |
| 2010/0235004 A1* | 9/2010 | Thind | ............................ | 700/277 |
| 2010/0262298 A1* | 10/2010 | Johnson et al. | ................ | 700/277 |
| 2011/0029136 A1* | 2/2011 | Altonen et al. | ................ | 700/275 |
| 2011/0253796 A1* | 10/2011 | Posa et al. | ..................... | 236/49.3 |

FOREIGN PATENT DOCUMENTS

| | | |
|---|---|---|
| JP | A-62-266348 | 11/1987 |
| JP | A-6-230144 | 8/1994 |
| JP | A-11-294839 | 10/1999 |
| JP | A-2002-206788 | 7/2002 |
| WO | WO 02/29749 A1 | 4/2002 |

OTHER PUBLICATIONS

Jan. 10, 2012 Office Action issued in Japanese Patent Application No. 2009-273382 (with translation).

* cited by examiner

Primary Examiner — Ronald Hartman, Jr.
(74) Attorney, Agent, or Firm — Oliff & Berridge, PLC

(57) ABSTRACT

Regarding rooms other than a room being targeted, a controller controls the rooms in energy-saving conditioning mode when a person is not detected in the rooms, even when the rooms are scheduled to be controlled in ordinary conditioning mode in a temperature control schedule. At this time, when the controller judges that the person has exited the room, the controller controls the targeted room in energy-saving conditioning mode, in rapid conditioning mode. As a result, the room is rapidly conditioned such that the temperature changes from an energy-saving temperature t to an ordinary set temperature by the time the person who has exited the room enters the room. As a result, unnecessary conditioning of the room set to be conditioning in ordinary conditioning mode can be reduced, and energy consumption can be reduced. In addition, comfort of the person entering the room can be ensured by prediction of the movement of the person.

2 Claims, 25 Drawing Sheets

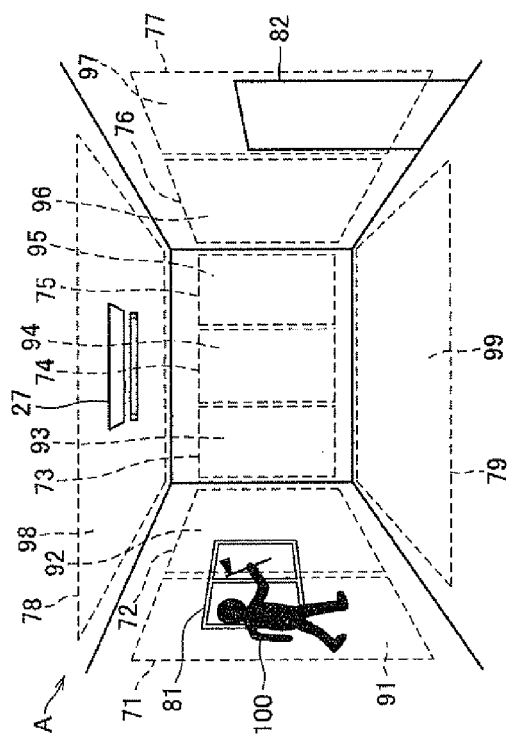
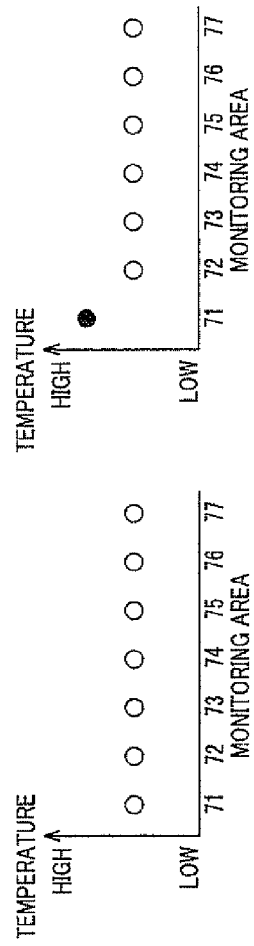

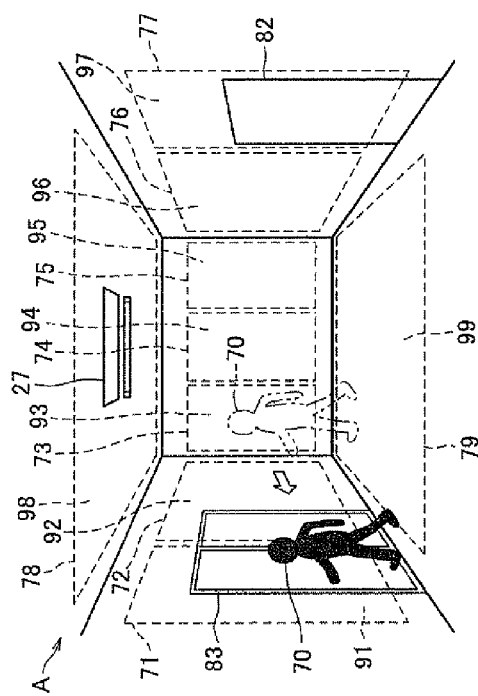
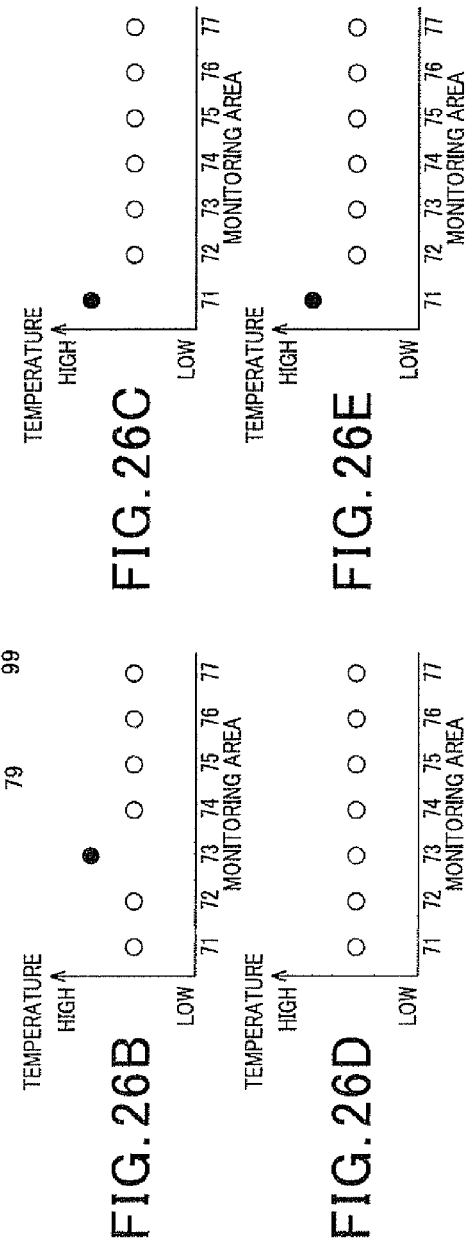

CENTRAL AIR-CONDITIONING SYSTEM

CROSS-REFERENCE TO RELATED APPLICATION

This application is based on and claims the benefit of priority from earlier Japanese Patent Application No. 2009-273382 filed Dec. 1, 2009, the description of which is incorporated herein by reference.

BACKGROUND OF THE INVENTION

1. Field of the Invention

The present invention relates to a central air-conditioning system that conditions a plurality of rooms in a house with a single air-conditioning unit.

2. Description of the Related Art

A central air-conditioning system is known that conditions a plurality of rooms in a house using a single air-conditioning unit, such as a heat pump. In the central air-conditioning system, the air-conditioning unit and each room are connected by air-conditioner ducts. Cold air or warm air generated by heat exchange performed in the air-conditioning unit is supplied to each room via the air-conditioner ducts. A controller of the central air-conditioning system individually controls the temperature of each room to a desired set temperature using the cold air or warm air sent from the air-conditioning unit.

Measures supporting the energy-conservation consciousness of recent years are essential also in a central air-conditioning system such as this. Therefore, an energy conservation measure is proposed for central air-conditioning systems in which a controller controls the temperature of a room in which a person is present, among a plurality of rooms in the house, to a comfort temperature near a set temperature and controls the temperatures of the rooms in which the person is not present to an energy-saving temperature that differs by several degrees Celsius from the set temperature, as shown in Japanese Patent Laid-open Publication No. 11(1999)-294839.

However, when temperature control is switched under a condition that the person is present in the room or is not present in the room as in Patent Literature 1, it is difficult to quickly change the temperature of a room the person has entered, when the person enters an unoccupied room. In other words, the central air-conditioning system simultaneously conditions the plurality of rooms within the house. Therefore, in the central air-conditioning system, it is difficult to quickly make comfortable the temperature of a room a person has newly entered while maintaining a comfortable temperature in a room in which a person is already present.

In addition, in the central air-conditioning system, temperatures of the plurality of rooms in the house are controlled to an ordinary set temperature or an energy-saving temperature closer to the outside temperature than the ordinary set temperature, following a schedule set in advance. In this instance, the temperatures of the plurality of rooms in the house are controlled in adherence to the schedule regardless of whether people are present in the rooms. For example, the temperature of a room that is scheduled to be controlled to the ordinary set temperature is maintained at the ordinary set temperature regardless of whether a person is present in the room. Therefore, energy is wasted, going against the demand for energy-saving measures. On the other hand, when a room originally intended to be controlled to the ordinary set temperature is controlled to the energy-saving temperature near the outside temperature when a person is not present, the temperature of the room is not maintained at the ordinary set temperature when a person enters the room. A problem occurs in that comfort is sacrificed.

SUMMARY OF THE INVENTION

Therefore, an object of the present invention is to provide a central air-conditioning system that reduces energy consumption without sacrificing comfort in a room scheduled to be set to an ordinary set temperature.

According to a first aspect of the invention, a controller performs a monitoring judging process for judging whether a person is present in a target room, whether a person has entered the target room, and whether a person has exited the target room using a person detecting unit. In other words, the controller judges not only the presence of a person in the target room, but entrance and exit of a person into and from the target room. As a result, when the temperature of any non-target room other than the target room is scheduled such to be controlled to an ordinary set temperature and an exit of a person from the target room is detected, the controller conditions the non-target room that is scheduled to be set to the ordinary set temperature in rapid conditioning mode. As a result, the non-target room is rapidly conditioned from an energy-saving temperature to the ordinary set temperature by the time the person who has exited the target room enters the non-target room scheduled to be set to the ordinary set temperature. On the other hand, the temperature of the non-target room is controlled to the energy-saving temperature until the exit of the person from the target room is detected, even when the non-target room is scheduled to be set to the ordinary set temperature. Therefore, energy consumption can be reduced without sacrificing comfort in a room scheduled to be set to the ordinary set temperature.

According to a second aspect of the invention, the person detecting unit includes infrared sensors for detecting the temperature in each monitoring area. The controller judges the presence of a person and the entrance and exit of a person using a peak temperature of each monitoring area detected by the infrared sensors. When a person is present in a target room, the peak temperature in any monitoring area among a plurality of monitoring areas rises because of the body temperature of the person. As a result, the presence of the person is detected in the target room. In addition, movement of the person, namely entrance and exit by the person, is also detected by detection of changes in the peak temperature in each monitoring area in the target room. Therefore, the presence or absence, and the entrance and exit of the person in the target room can be judged with certainty without requiring a complicated structure.

BRIEF DESCRIPTION OF THE DRAWINGS

In the accompanying drawings:

FIG. 10A and FIG. 10B are diagrams of a relationship between time and temperature in the central air-conditioning system according to the first embodiment, in which FIG. 10A shows ordinary set temperature and energy-saving temperature during cooling and FIG. 10B shows temperature changes in rapid conditioning mode and ordinary conditioning mode during cooling in a target room;

FIG. 25A is a diagram including an intruder, and FIG. 25B and FIG. 25C are diagrams showing changes in the peak temperature in each monitoring area when an intruder is present, in a central air-conditioning system according to a third embodiment; and FIG. 26A is a diagram including a person exiting to outdoors, and FIG. 26B to FIG. 26E are diagrams showing changes in the peak temperature in each monitoring area when a person enters from outdoors and exits to outdoors.

DETAILED DESCRIPTION OF THE PREFERRED EMBODIMENTS

Several preferred embodiments of a central air-conditioning system of the present invention will hereinafter be described with reference to the drawings. Constituent sections of the embodiments that are essentially the same are given the same reference numbers. Explanations thereof are omitted.

First Embodiment

Figure 1:
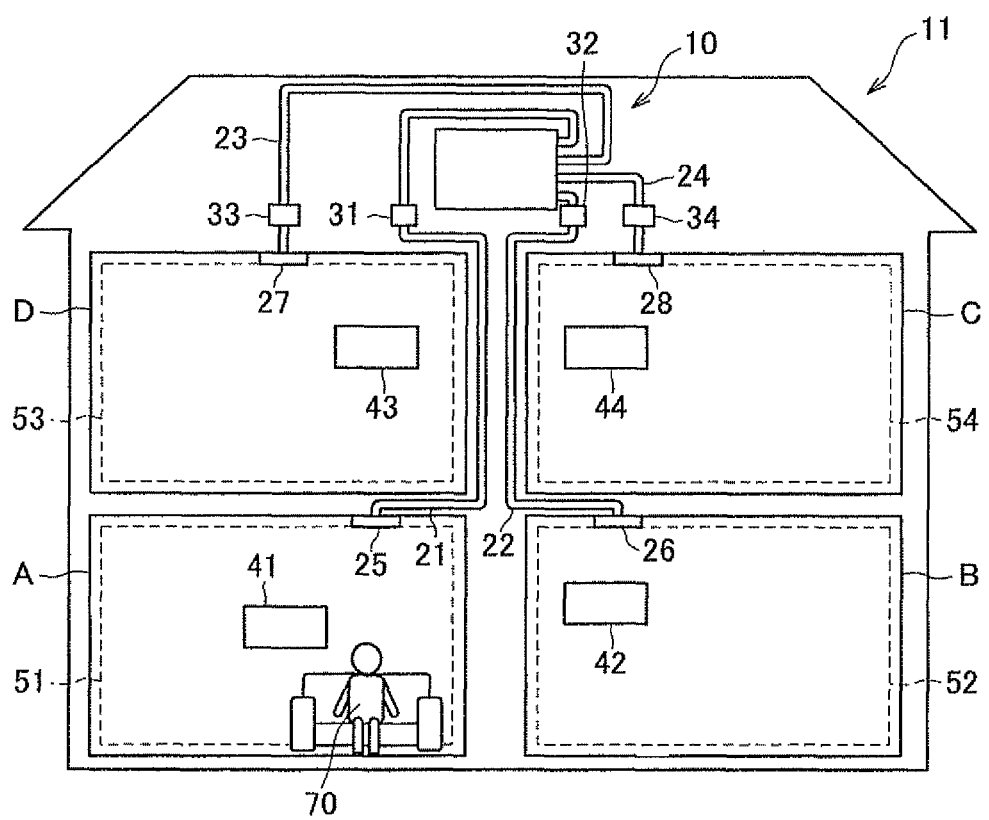
FIG. 1 is a schematic diagram of a house to which a central air-conditioning system according to a first embodiment is applied.
Figure 2:
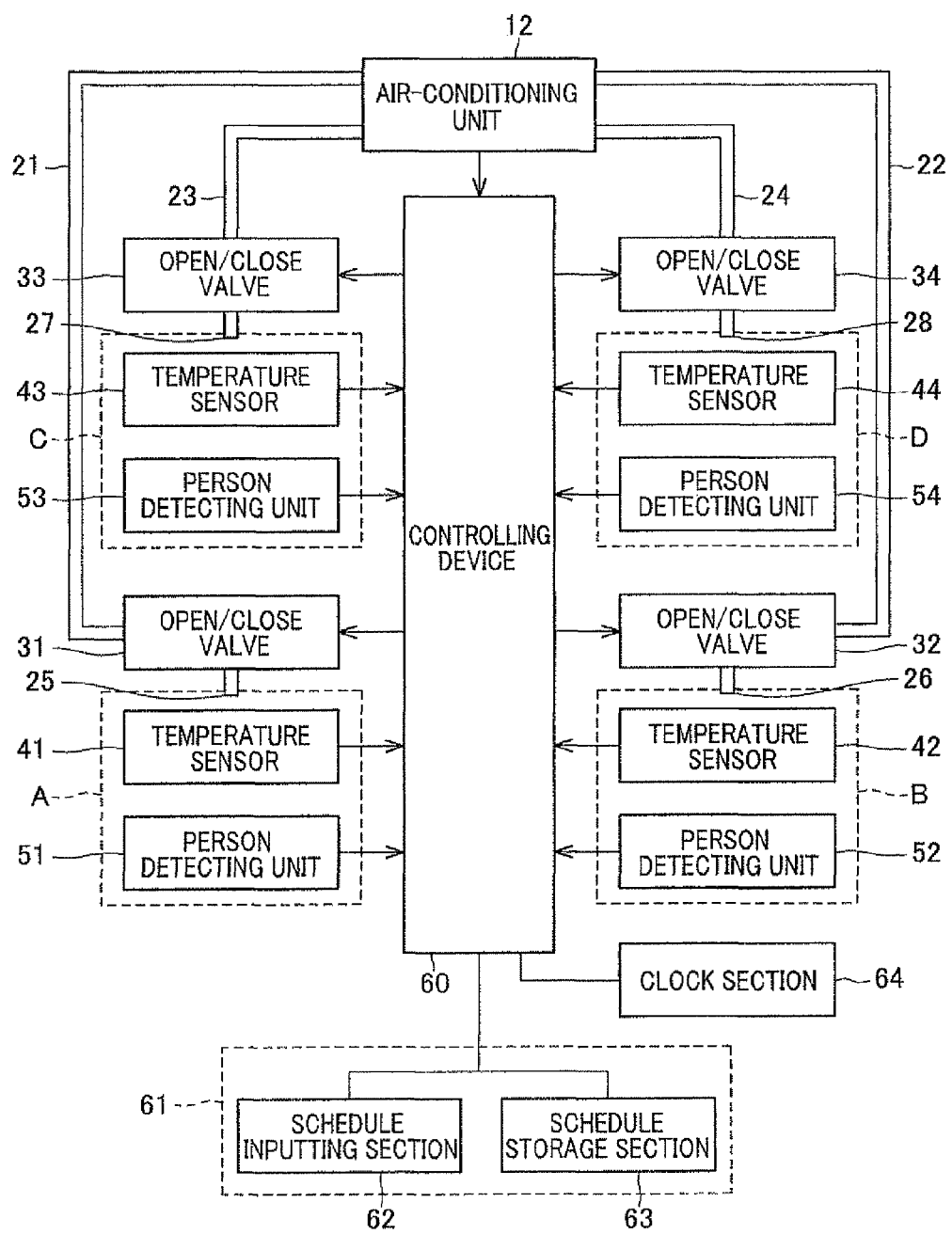
FIG. 2 is a block diagram of the central air-conditioning system according to the first embodiment.

First, a configuration of a central air-conditioning system according to a first embodiment of the present invention will be described. As shown in FIG. 1, a central air-conditioning system 10 is provided in a house 11 having a plurality of rooms: room A, room B, room C, and room D. Here, to simplify the explanation, the central air-conditioning system 10 is described giving as an example the house 11 having four rooms A to D. As shown in FIG. 1 and FIG. 2, the central air-conditioning system 10 includes an air-conditioning unit 12, air-conditioner ducts 21 to 24, open/close valves 31 to 34, temperature sensors 41 to 44, person detecting units 51 to 54, and a controller 60 which is called a thermostat in some cases. The temperature sensors 41 to 44 and the person detecting units 51 to 54 are respectively provided in the four rooms A to D.

The air-conditioning unit 12 is, for example, configured by an external unit and an internal unit, and includes a known heat exchanger, such as a heat pump. With this configuration, the air-conditioning unit 12 supplies cold air or warm air to each room A to D. The air-conditioner duct 21 connects the air-conditioning unit 12 and the room A. In a similar manner, the air-conditioner duct 22 connects the air-conditioning unit 12 and the room B. The air-conditioner duct 23 connects the air-conditioning unit 12 and the room C. The air-conditioner duct 24 connects the air-conditioning unit 12 and the room D. The room A to D side of each air-conditioner duct 21 to 24 forms an air outlet 25 to 28 from which the cold air or warm air supplied by the air-conditioning unit 12 is blown. The open/close valves 31 to 34 are respectively provided in the air-conditioner ducts 21 to 24. In other words, the open/close valve 31 opens and closes the air-conditioner duct 21. The open/close valve 32 opens and closes the air-conditioner duct 22. The open/close valve 33 opens and closes the air-conditioner duct 23. The open/close valve 34 opens and closes the air-conditioner duct 24.

The controller 60 is configured by a microcomputer composed of, for example, a central processing unit (CPU), a read-only memory (ROM), and a random access memory (RAM). The controller 60 performs overall control of the central air-conditioning system 10 in adherence to a computer program stored in the ROM. The controller 60 is connected to the above-described air-conditioning unit 12 and each open/ close valve 31 to 34. The air-conditioning unit 12 switches between generating cold air and generating warm air, and changes the amount of air generated in adherence to instructions from the controller 60. Each open/close valve 31 to 34 opens or closes the corresponding air-conditioner duct 21 to 24 in adherence to instructions from the controller 60.

The controller 60 is connected to the temperature sensors 41 to 44 respectively provided in the rooms A to D. The temperature sensor 41 detects the temperature of the room A and outputs the detected temperature to the controller 60 as an electrical signal. In a similar manner, the temperature sensor 42 outputs the detected temperature of the room B to the controller 60 as an electrical signal. The temperature sensor 43 outputs the detected temperature of the room C to the controller 60 as an electrical signal. The temperature sensor 44 outputs the detected temperature of the room D to the controller 60 as an electrical signal. The controller 60 is also connected to the person detecting units 51 and 54 respectively provided in the rooms A to D. The person detecting unit 51 detects whether a person 70 is present in the room A, as well as entrance of the person 70 into the room A and exit from the room A. The person detecting unit 51 then outputs the detected presence or absence of the person 70, or the detected entrance or exit of the person 70 to the controller 60 as an electrical signal. In a similar manner, the person detecting unit 52 outputs the detected presence or absence of the person 70, or the detected entrance or exit of the person 70 for the room B to the controller 60 as an electrical signal. The person detecting unit 53 outputs the detected presence or absence of the person 70, or the detected entrance or exit of the person 70 for the room C to the controller 60 as an electrical signal. The person detecting unit 54 outputs the detected presence or absence of the person 70, or the detected entrance or exit of the person 70 for the room D to the controller 60 as an electrical signal.

The controller 60 individually adjusts the degree of opening of each open/close valve 31 to 34 that opens and closes the air-conditioner duct 21 to 24, based on the presence or absence of the person 70 for each room A to D detected by the person detecting unit 51 to 54 and the temperature of each room A to D detected by the temperature sensor 41 to 44. As a result, the controller 60 individually controls the temperature of each room A to D, based on the presence or absence of the person 70 and the temperature.

The controller 60 is connected to a scheduling section 61. The scheduling section 61 includes a schedule inputting section 62 and a schedule storage section 63. The schedule inputting section 62 is configured by an inputting means, such as a touch panel or various switches. The schedule storage section 63 is configured by a non-volatile storage means and the like. The scheduling section 61 sets, as a temperature control schedule, whether to set the temperature of each room to an ordinary set temperature T or an energy-saving temperature t that is closer to the outside temperature than the ordinary set temperature T, for each time period. A user enters the temperature control schedule from the schedule inputting section 62 in adherence to the lifestyle of the resident of the house 11. The controller 60 also includes a clock section 64. As a result, the controlling section 60 controls the temperature of each room A to D in adherence to the temperature control schedule, based on the time kept by the clock section 64.

Figure 3A:
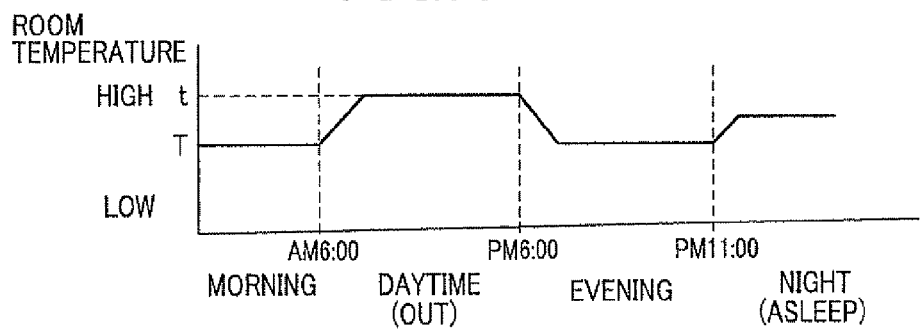
FIG. 3A is a diagram of a typical temperature control schedule.
Figure 3B:
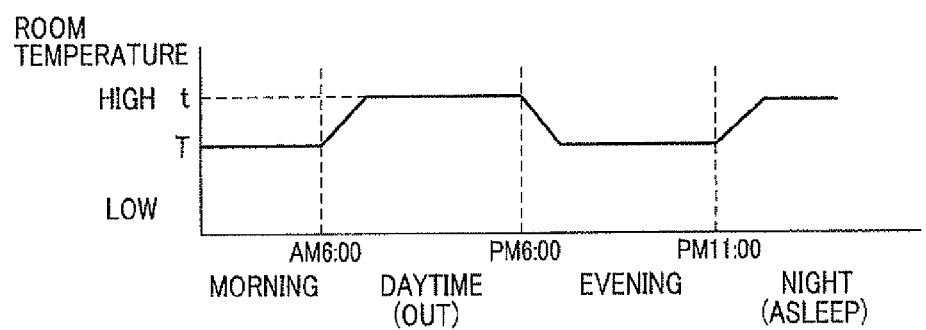
FIG. 3B is a diagram of a living room temperature control schedule.
Figure 3C:
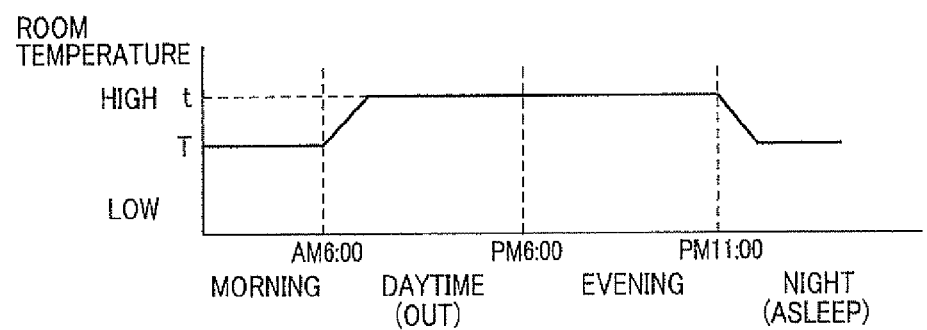
FIG. 3C is a diagram of a bedroom temperature schedule of the central air-conditioning system according to the first embodiment.

Specifically, as shown in FIG. 3A, in the temperature control schedule, whether the temperature of a predetermined room is set to the ordinary set temperature T or the energy-saving temperature t is set for each time period. FIG. 3A to FIG. 3C show temperature control schedules during cooling in the summer as an example. The higher temperature is the energy-saving temperature t and the lower temperature is the ordinary set temperature T, In FIG. 3A, the temperature during a time period in the morning, from 6AM to 9AM, and a time period from evening to night, from 6PM to 11PM, is set to the ordinary set temperature T. On the other hand, in FIG. 3A, the temperature during a time period in the daytime when the resident is out, from 9AM to 6PM, and a time period from late night to early morning when the resident asleep, from 11PM to 6AM of the following morning, is set to the energy-saving temperature t. As a result of the temperature control schedule being set in this way, the controller 60 controls the temperature of the room in adherence to the temperature control schedule. Therefore, the temperature during the time period in the daytime when the resident is out and the time period from late night to early morning when the resident is asleep can be controlled to the energy-saving temperature t. On the other hand, the temperature during the time period in the morning when the resident is active and the time period from evening to night when the resident returns home and is present can be controlled to the ordinary set temperature T. Power consumption can be reduced, and comfort can be enhanced.

The temperature control schedule can also be set separately for each room in the house 11. FIG. 3B is a temperature control schedule for the room A that is equivalent to a living room. The temperature control schedule of the room A is set such that the temperature is the ordinary set temperature T in the morning and from evening to night, and the energy-saving temperature t during the day when the resident is out and from late night to early morning when the resident is asleep, in adherence to the lifestyle of the resident as described above with reference to FIG. 3A. On the other hand, FIG. 3C is a temperature control schedule for the room D that is equivalent to a bedroom. Because it is the bedroom, the room D is generally used during the time period from night to early morning when the resident is asleep. Therefore, the temperature control schedule of the room D is set such that the temperature is the ordinary set temperature T from late night to early morning, from 11PM to 6AM, and the energy-saving temperature t during the other hours from 6AM to 11PM. As a result, the controller 60 controls the temperature of the room D to a comfortable ordinary set temperature T only during the time period when the resident is asleep. The temperature during time periods other than when the resident is asleep, when the resident is most likely out, is controlled to the energy-saving temperature t. As a result, both reduced power consumption and enhanced comfort can be achieved.

Next, the person detecting units 51 to 54 will be described in detail. The person detecting units 51 to 54 all have the same configuration. Therefore, the person detecting unit 51 will be described herein as an example.

(Monitoring Areas)

Figure 4A:
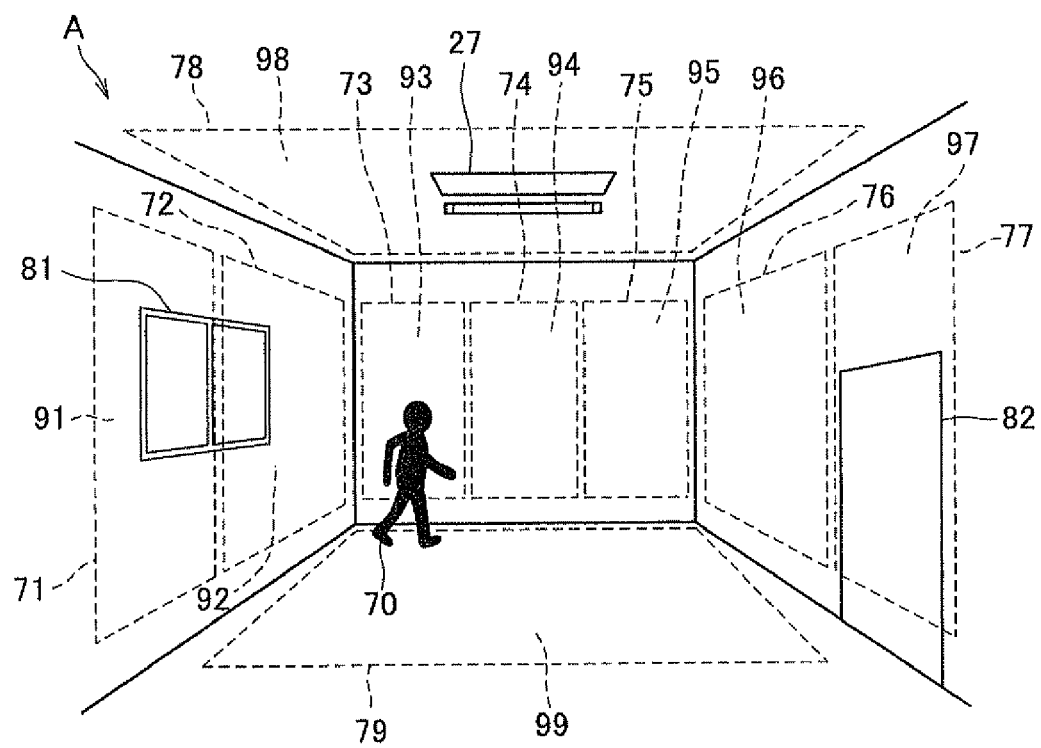
FIG. 4A is a diagram of monitoring areas in a room A and FIG. 4B is a diagram of the temperature in each monitoring area detected by thermopile sensors.

As shown in FIG. 4A, the room A is divided into a plurality of monitoring areas 71 to 79. Specifically, the room A is divided into seven monitoring areas 71 to 77 along wall faces, a monitoring area 78 provided on the ceiling, and a monitoring area 79 provided on the floor. The monitoring area 71 and the monitoring area 72 include a window 81. Furthermore, the monitoring area 77 includes a doorway 82 to the room A. The person detecting unit 51 has thermopile sensors 91 to 99 for each monitoring area 71 to 79. The thermopile sensors 91 to 99 are infrared sensors that detect a peak temperature in the respective monitoring areas 71 to 79. The person detecting unit 51 is required to check with certainty the presence or absence of the person 70 in the room A, and the entrance and exit of the person into and from the room A. However, the body shape of the person 70 differs depending on age and sex.

Figure 5:
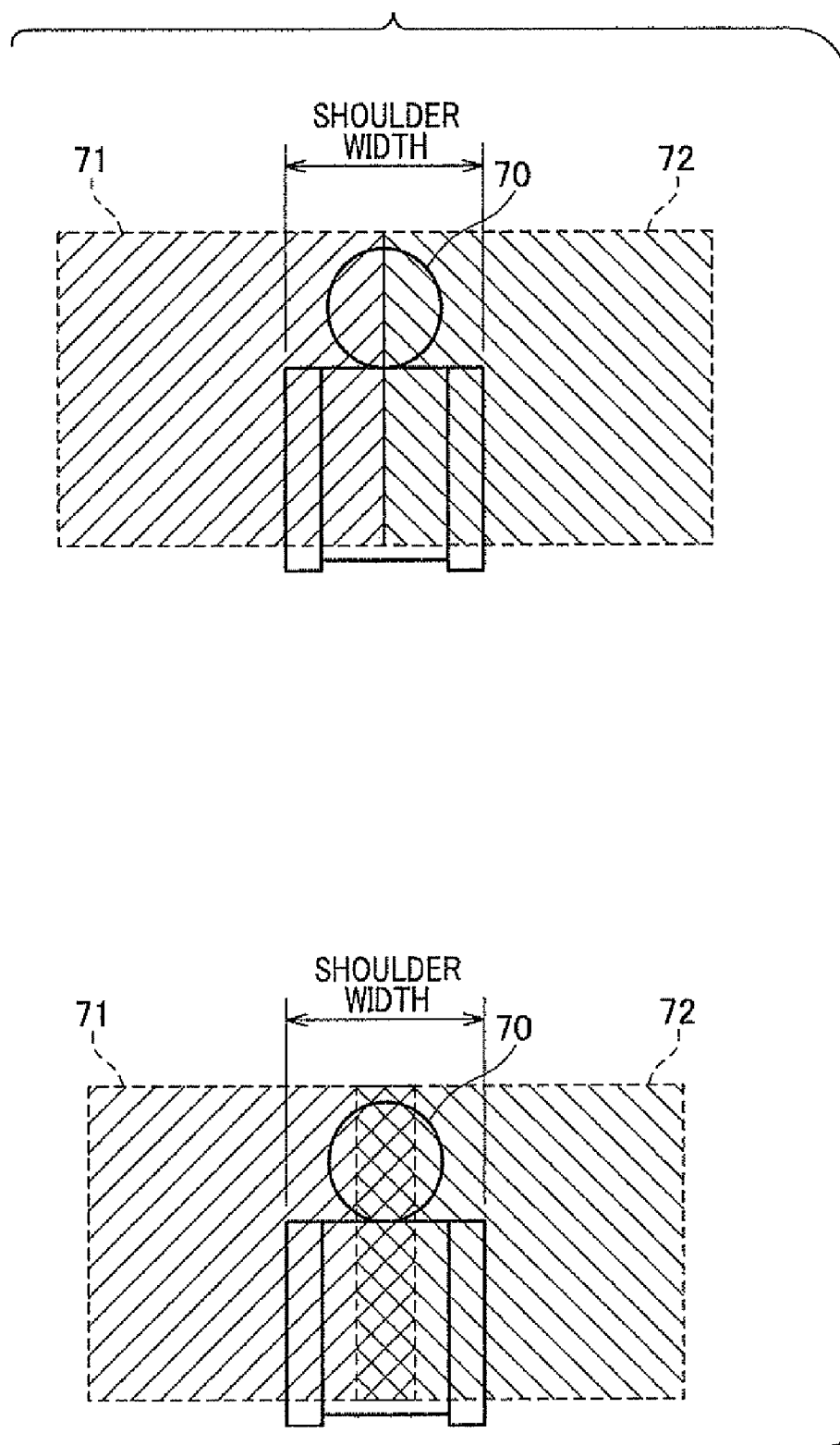
FIG. 5 is an explanatory diagram explaining setting of the monitoring areas in the central air-conditioning system according to the first embodiment.

Therefore, to check with certainty the number of persons 70 in the room A, and the entrance and exit of the person 70 into and from the room A, the monitoring areas 71 to 79 are required to be set such that the two monitoring areas 71 and 72 are adjacent as shown in FIG. 5A, or the two monitoring areas 71 and 72 overlap as shown in FIG. 5B. The monitoring area 71 and the monitoring area 72 in FIG. 5A and FIG. 5B are given as examples. Other monitoring areas are also set to be adjacent to or overlapping with each other.

According to the first embodiment, the person detecting unit 51 detects the presence of the person 70 in the room A from the peak temperatures detected by the thermopile sensors 91 to 97 of the monitoring areas 71 to 77 set along the wall faces. The presence of the person 70 in the room A can also be detected using the peak temperatures respectively detected by the thermopile sensor 98 of the monitoring area 78 set on the ceiling and the thermopile sensor 99 of the monitoring area 79 set on the floor, in addition to the peak temperatures detected by the thermopile sensors 91 to 97. The monitoring areas and the thermopile sensors are also provided in this way in the rooms B to D, in addition to in the room A.

Figure 4B:
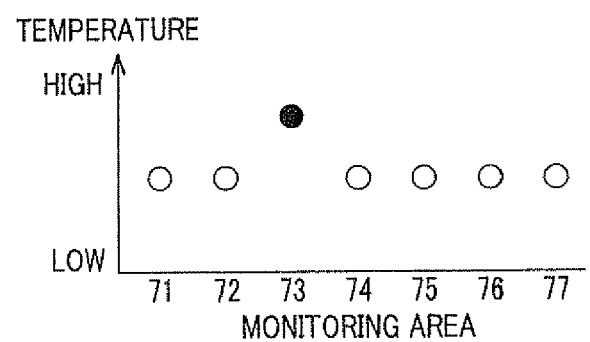

For example, as shown in FIG. 4A, the person 70 is in the monitoring area 73 of the room A. At this time, as shown in FIG. 4B, the peak temperature corresponding to the person 70 detected by the thermopile sensor 93 provided in the monitoring area 73 is higher compared to the peak temperatures detected in the other monitoring areas 71, 72, and 74 to 77. As a result, the controller 60 that receives a signal from the person detecting unit 51 confirms that a person is in the monitoring area 73 in the room A. In other words, the controller 60 performs a monitoring judging process as described below.

(Exit Detection)

Figure 6:
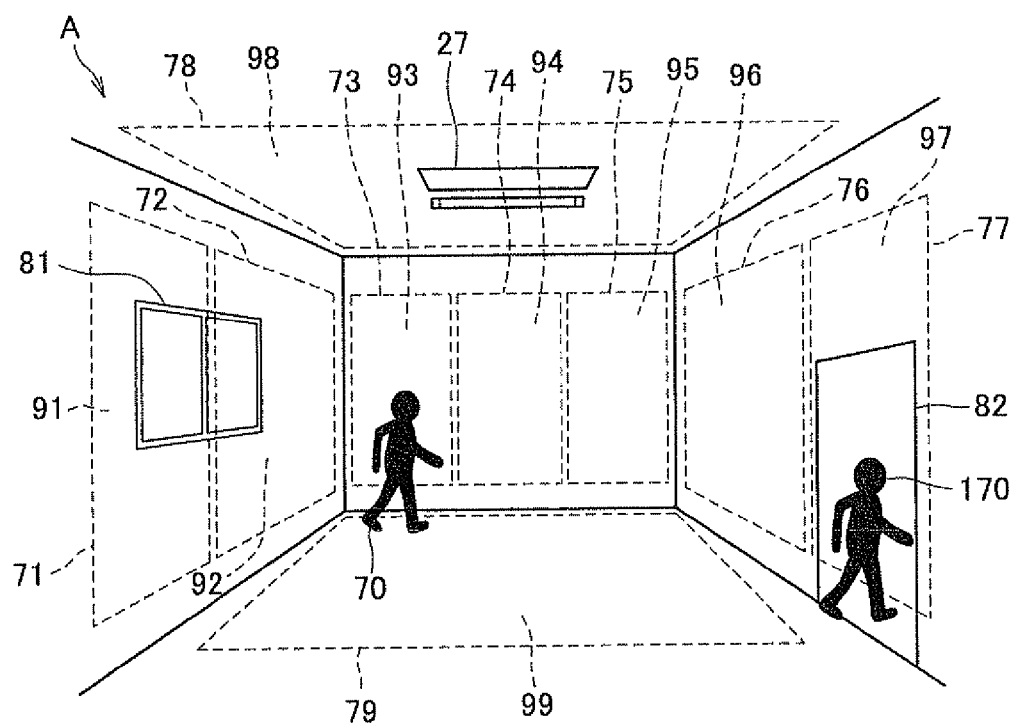
FIG. 6 is a diagram including a person leaving a room in the central air-conditioning system according to the first embodiment.
Figure 7:
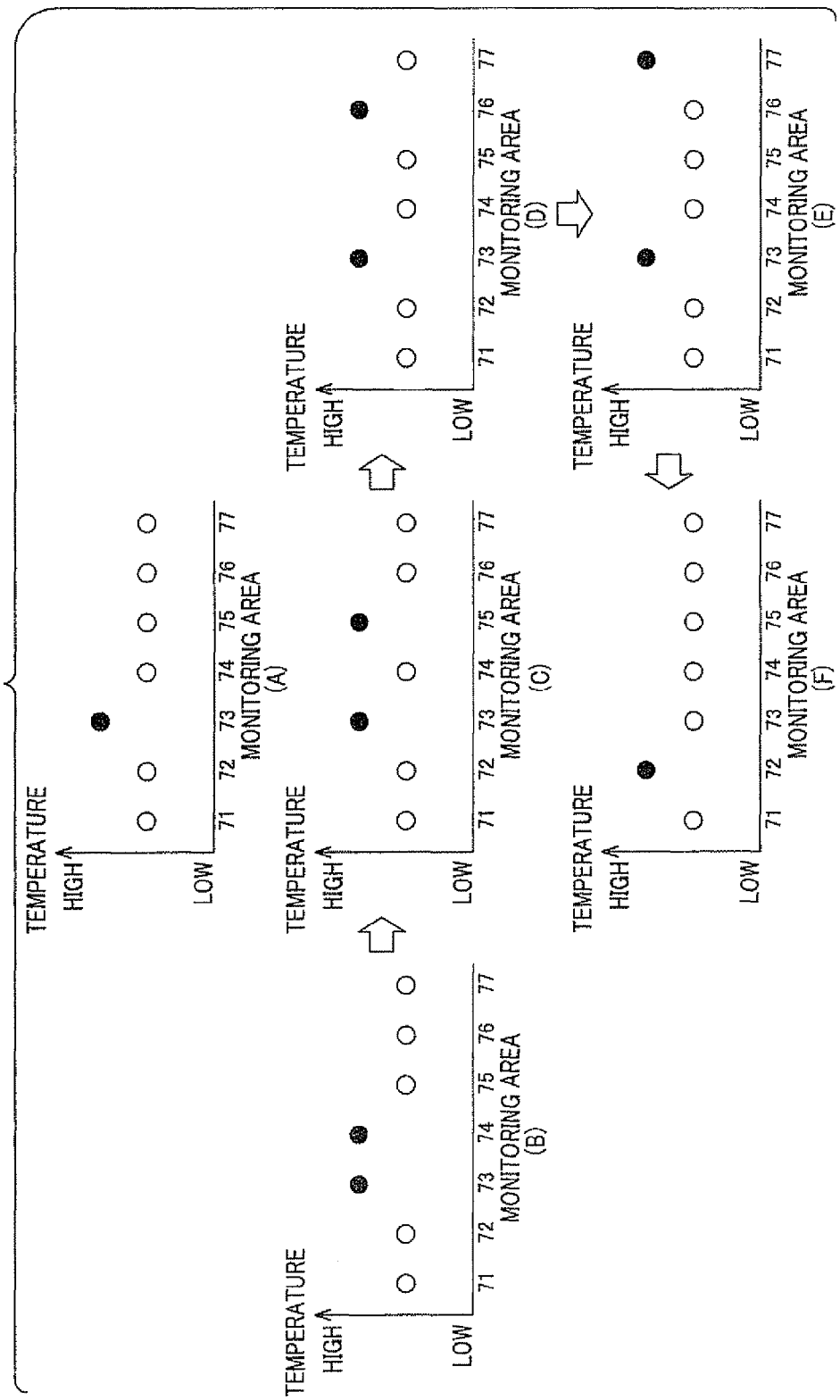
FIG. 7 is a diagram of changes in peak temperature in each monitoring area when a person exits the room in the central air-conditioning system according to the first embodiment.

First, exit detection performed when two persons 70 and 170 are in the room A and one of the two persons 70 and 170 exits the room A will be described with reference to FIG. 6 and FIG. 7. For example, the two persons 70 and 170 are present in the monitoring area 73 of the room A. Of the two persons 70 and 170, one person 170 exits the room A from the doorway 82, as shown in FIG. 6. In this instance, in the initial state when the person 70 and the person 170 are present in the monitoring area 73, the thermopile sensor 93 for the monitoring area 73 detects a higher temperature than the thermopile sensors in the other monitoring areas, as shown in FIG. 7A.

Then, when the person 170 of the two persons 70 and 170 moves towards the doorway 82 to exit the room A, the person 170 moves to the monitoring area 77 in which the doorway 82 is located by moving from the monitoring area 73 to the monitoring area 74, the monitoring area 75, and the monitoring area 76. Therefore, whereas only the thermopile sensor 93 of the monitoring area 73 detects the relatively high temperature as shown in FIG. 7A, the thermopile sensor 94 also detects the high temperature in addition to the thermopile sensor 93, as shown in FIG. 7B. In other words, the monitoring area in which the peak temperature is detected becomes divided from the single monitoring area 73 to the monitoring area 73 and the monitoring area 74. Furthermore, with the movement of the exiting person 170 as shown in FIG. 7B to FIG. 7E, the peak temperature moves from the monitoring area 75 to the monitoring area 77, while the peak temperature is continuously detected in the monitoring area 73. Then, after the thermopile sensor 97 of the monitoring area 77 detects the peak temperature, the peak temperature of the person 170 is no longer detected as a result of the person 170 exiting the room A from the doorway 82. Therefore, the peak temperature is once again detected only in the monitoring area 73 in which the person 70 is present.

As a result of the movement of the peak temperature from the monitoring area 71 to the monitoring area 77 being detected as described above, the movement of the person 170 can be tracked. In this instance, the person 170 moves to the monitoring area 77 in which the doorway 82 is provided after passing though the monitoring area 76. Therefore, when the peak temperature is detected in the monitoring area 77 after being detected in the monitoring area 76 and then disappears, the controller 60 judges that the person 170 has exited the room A. In other words, the monitoring area 77 is equivalent to a doorway area in the scope of claims. The monitoring area 76 adjacent to the monitoring area 77 is equivalent to an adjacent monitoring area in the scope of claims.

(Entrance Detection)

Figure 8A:
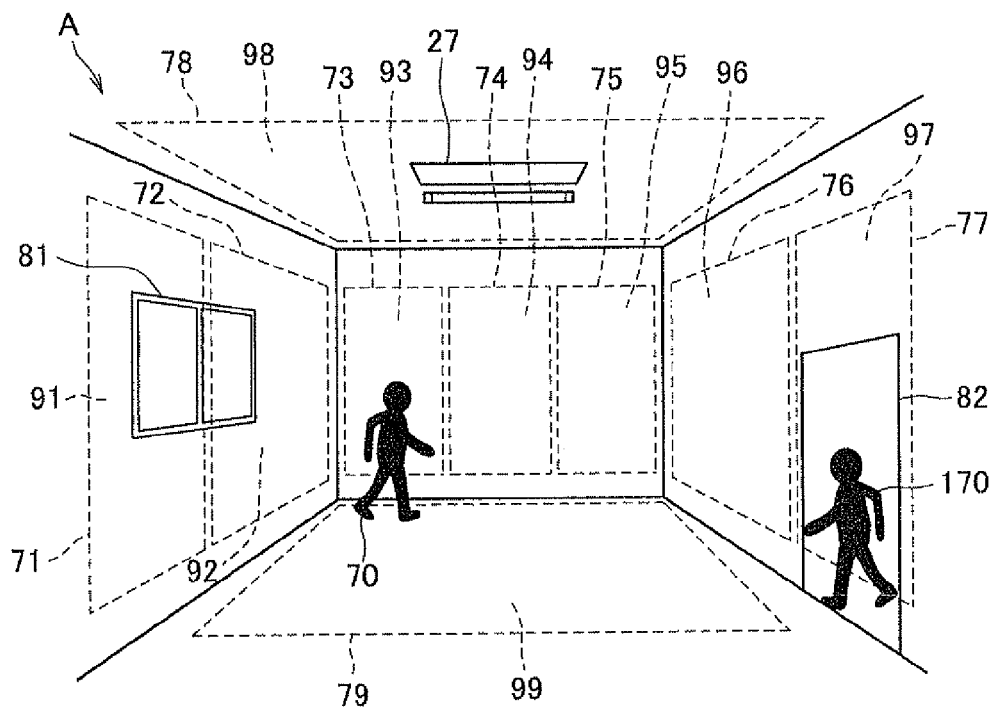
FIG. 8A is a diagram including a person entering a room and FIG. 8B is a diagram of a peak temperature in each monitoring area when a person enters the room in the central air-conditioning system according to the first embodiment.
Figure 8B:
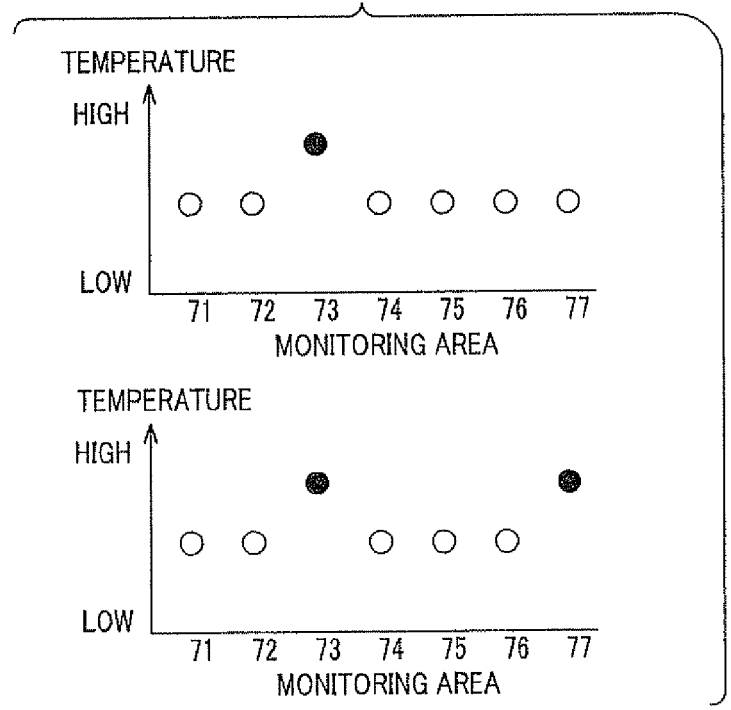

Next, entrance detection performed when a new person 170 enters the room A while the person 70 is present will be described with reference to FIG. 8A to FIG. 8C. For example, as shown in FIG. 8A, the person 70 is present in the monitoring area 73 of the room A. The person 170 newly enters the room A from the doorway 82. In this instance, in the initial state in which the person 70 is present in the monitoring area 73, the thermopile sensor 93 of the monitoring area 73 detects the peak temperature as shown in FIG. 8B.

When the new person 170 enters the room A from the doorway 82, the thermopile sensor 97 of the monitoring area 77 in which the doorway 82 is provided detects a new peak temperature as shown in FIG. 8C. Therefore, the peak temperature is detected in the monitoring area 77, in addition to the monitoring area 73. As described above, when the peak temperature is detected by the thermopile senor 97 of the monitoring area 77 in which the doorway 82 is provided while the presence of the person 70 is confirmed in any monitoring area of the room A, the controller 60 judges that the new person 170 has entered the room A. Moreover, the controller 60 judges that a person has entered the room A when the thermopile sensor 97 of the monitoring area 77 in which the doorway 82 is provided detects the peak temperature, even when no one is present in the room A.

(Multiple-Person Detection)

Figure 9:
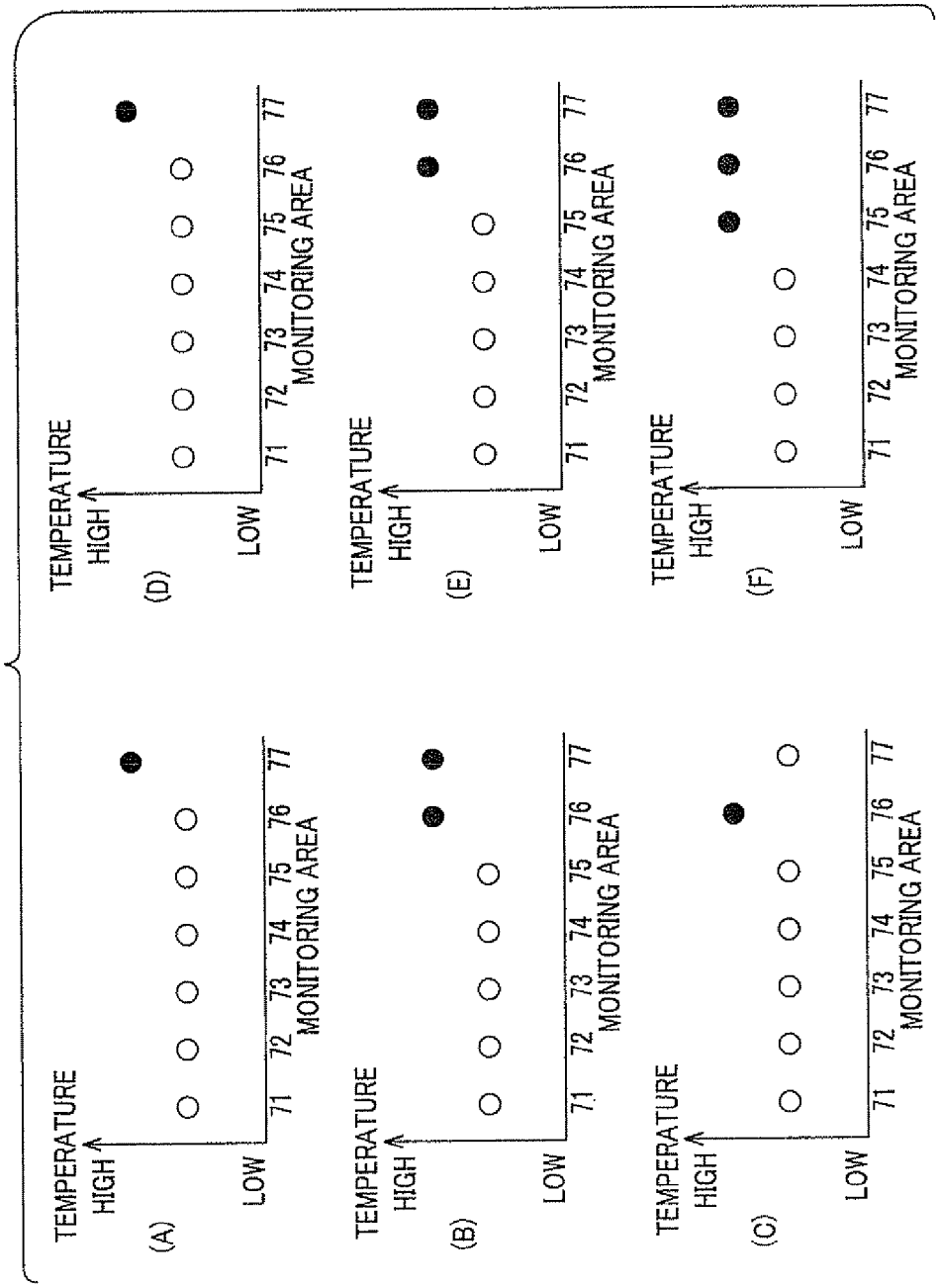
FIG. 9 is a diagram of changes in the peak temperature in each monitoring area in a room in which a plurality of people are present, in the central air-conditioning system according to the first embodiment.

Next, recognition of the positions of a plurality of people in the room A will be described with reference to FIG. 9A to FIG. 9F. As shown in FIG. 9A, when the thermopile senor 97 of the monitoring area 77 detects the peak temperature, the controller 60 judges that the person 70 has entered the room A. The person 70 who has entered the room A gradually moves into the room A. Therefore, the peak temperature is detected by the thermopile sensor 96 of the monitoring area 76 after being detected by the thermopile sensor 97 of the monitoring area 77, as shown in FIG. 9B. Then, when the movement stops in a state in which the peak temperature is detected in the monitoring area 76 as shown in FIG. 9C, the controller 60 judges that the person 70 who has entered is positioned in the monitoring area 76 of the room A.

In a similar manner, when the peak temperature is detected in the monitoring area 77 as shown in FIG. 9D, the controller 60 judges that the person 70 has entered the room A. The person 70 who has entered the room A gradually moves into the room A. Therefore, the peak temperature is detected in the monitoring area 76 after being detected in the monitoring area 77, as shown in FIG. 9E. When the peak temperature is continuously detected in the monitoring area 77 regardless of the peak temperature being also detected in the monitoring area 75, as shown in FIG. 9F, the controller 60 judges that a new person 170 has entered the room A after the person 70. In other words, the controller 60 judges that a second person has entered the room A. In this way, as a result of the monitoring areas 71 to 77 of the room A being set as shown in FIG. 5A and FIG. 5B, the controller 60 can know not only whether the persons 70 and 170 have entered the room A, but also the number of persons that have entered the room A.

Next, operations of the central air-conditioning system 10, configured as above, will be described.

(Conditioning Mode)

Figure 10A:
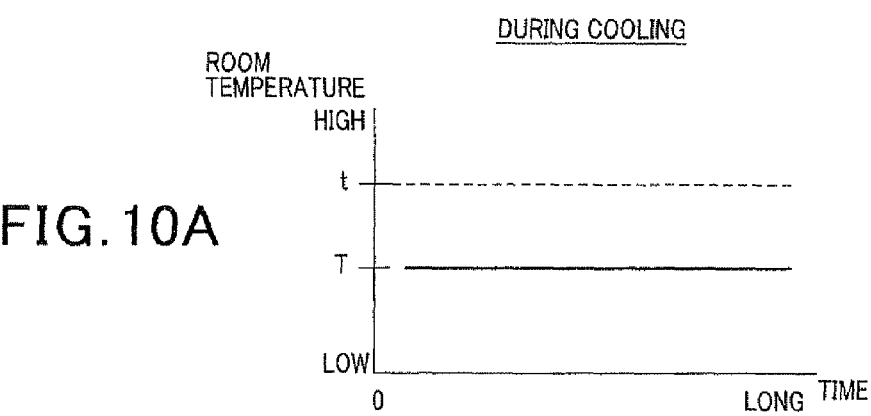

The controller 60 operates in ordinary conditioning mode for performing ordinary conditioning, energy-saving conditioning mode for performing energy-saving conditioning, or rapid conditioning mode for performing rapid conditioning, depending on the presence or absence of the person 70 in the rooms A to D of the house 11. As shown in FIG. 10A, in ordinary conditioning mode, the temperature of each room A to D is controlled to the ordinary set temperature T set in advance. In energy-saving conditioning mode, the temperature of each room A to D is controlled to an energy-saving temperature t set in advance and set closer to the outside temperature than the ordinary set temperature T. For example, when the ordinary set temperature T is set to 25° C. during cooling, the energy-saving temperature t is set to 28° C. or the like that has a lower load and is closer to the outside temperature. On the other hand, when the ordinary set temperature T during heating is set to 25° C., the energy-saving temperature t is set to 22° C. or the like that is closer to the outside temperature.

Figure 10B:
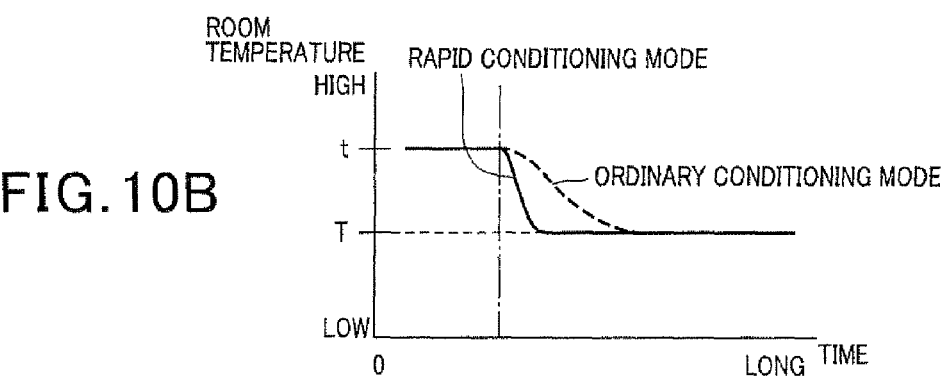

In rapid conditioning mode, each room A to D is conditioned in a concentrated manner to quickly change the temperature from the energy-saving temperature t to the ordinary set temperature T set in advance. Therefore, as indicated by a solid line in FIG. 10B, the temperature of the room in which rapid conditioning is performed changes to the ordinary set temperature T more quickly than when ordinary conditioning, indicated by a broken line, is performed. When rapid conditioning is performed in each room, the cold air or warm air generated by the air-conditioning unit 12 is supplied in a concentrated manner to the room in which rapid conditioning is being performed. Therefore, the temperature of the room in which rapid conditioning is being performed quickly changes to the ordinary set temperature T1 as indicated by the solid line in FIG. 4B. On the other hand, conditioning of the rooms other than the room A in which the rapid conditioning is being performed is temporarily restricted as a result of the rapid conditioning. In FIG. 10A and FIG. 10B, an average temperature change in the rooms is shown to simplify the explanation.

Figure 11:
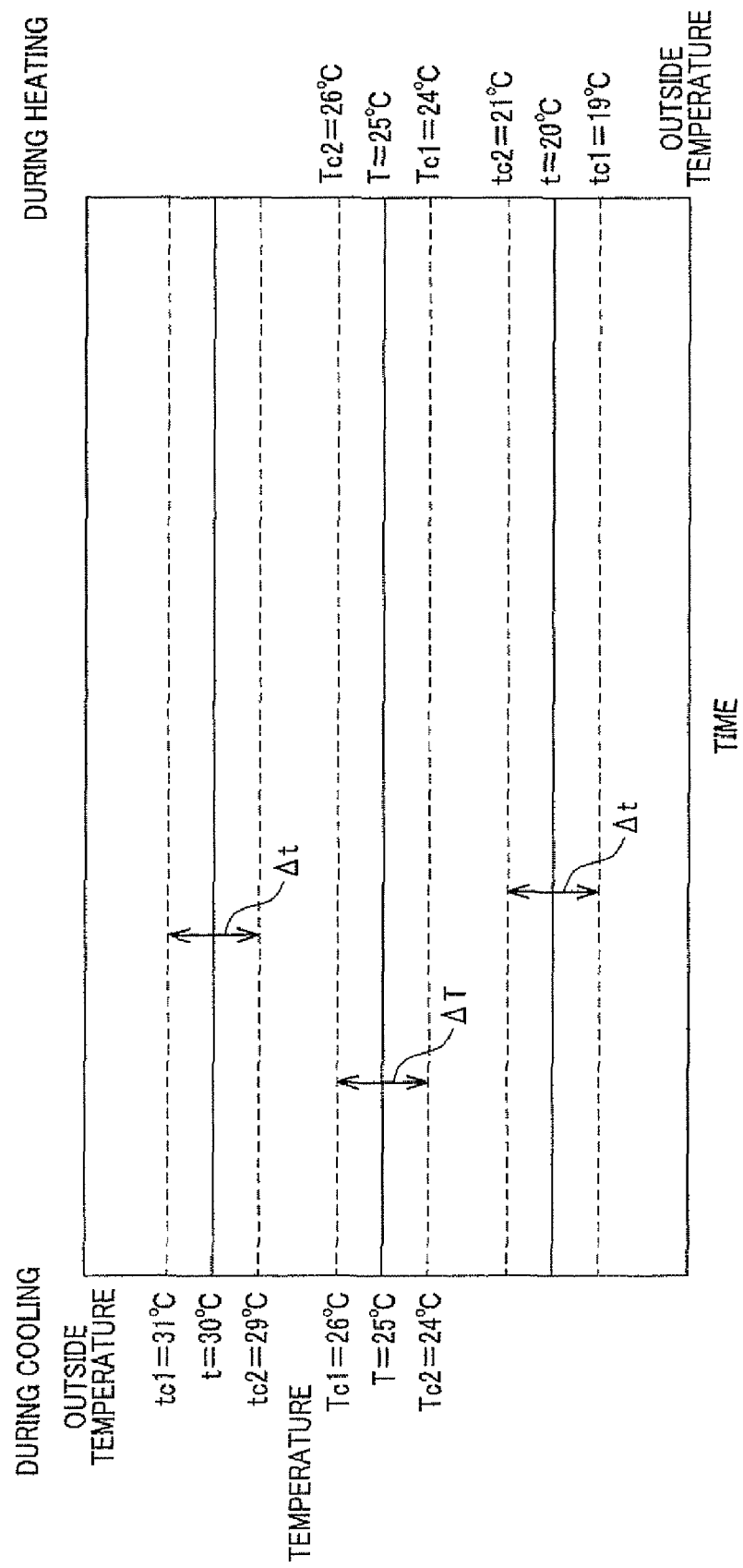
FIG. 11 is a diagram of control ranges of the ordinary temperature and the energy-saving temperature during cooling and during heating.

When the room A serving as a target room is conditioned in ordinary conditioning mode, the controller 60 controls the temperature of the room A within an ordinary temperature range ΔT, from an ordinary outside-temperature-side limit temperature Tc1 close to the outside temperature to an ordinary counter-outside-temperature-side limit temperature Tc2 far from the outside temperature with the ordinary set temperature T therebetween. For example, as shown in FIG. 11, when the ordinary set temperature T is 25° C. during cooling, the ordinary outside-temperature-side limit temperature Tc1 is set to 26° C. or the like, and the ordinary counter-outside-temperature-side limit temperature Tc2 is set to 24° C. or the like. When, for example, the ordinary set temperature T is 25° C. during heating, the ordinary outside-temperature-side limit temperature Tc1 is set to 24° C. or the like, and the ordinary counter-outside-temperature-side limit temperature Tc2 is set to 26° C. or the like. The controller 60 controls the temperature of the room A within the ordinary temperature range ΔT, from the ordinary outside-temperature-side limit temperature Tc1 to the ordinary counter-outside-temperature-side limit temperature Tc2 with the ordinary set temperature T therebetween.

For example, during cooling in ordinary conditioning mode, when the temperature of the room A reaches the ordinary outside-temperature-side limit temperature Tc1 of 26° C., the controller 60 opens the open/close valve 31 in the air-conditioner duct 21 and supplies cold air to the room A. When the temperature of the room A drops to the ordinary counter-outside-temperature-side limit temperature Tc2 of 24° C. as a result of the supplied cold air, the controller 60 closes the open/close valve 31 in the air-conditioner duct 21 and stops supplying the cold air to the room A. As a result, the temperature of the room A is controlled such that the average temperature is the ordinary set temperature T of 25° C. In a similar manner, during heating, when the temperature of the room A reaches the ordinary outside-temperature-side limit temperature Tc1 of 24° C., the controller 60 opens the open/close valve 31 in the air-conditioner duct 21 and supplies warm air to the room A. When the temperature of the room A reaches the ordinary counter-outside-temperature-side limit temperature Tc2 of 26° C. as a result of the supplied warm air, the controller 60 closes the open/close valve 31 in the air-conditioner duct 21 and stops supplying the warm air to the room A. As a result, the temperature of the room A is controlled such that the average temperature is the ordinary set temperature T of 25° C. The same applies to the rooms B to D other than the room A. The temperature of the room A is given as an example to simplify the explanation. The temperature difference between the ordinary set temperature T and the temperatures on the side close to the outside temperature and on the side far from the outside temperature can be changed. In addition, the temperature difference between the ordinary set temperature T and the temperatures on the side close to the outside temperature and on the side far from the outside temperature can differ depending on whether cooling or heating is performed.

When the room A is conditioned in energy-saving conditioning mode, the controller 60 controls the temperature of the room A within an energy-saving temperature range Δt, from an energy-saving outside-temperature-side limit temperature tc1 close to the outside temperature to an energy-saving counter-outside-temperature-side limit temperature tc2 far from the outside temperature with the energy-saving temperature t therebetween. For example, when the ordinary set temperature T is 25° C. during cooling, the energy-saving temperature t is set to 30° C. The energy-saving outside-temperature-side limit temperature tc1 is set to 31° C. or the like, and the energy-saving counter-outside-temperature-side limit temperature tc2 is set to 29° C. or the like. When, for example, the ordinary set temperature T is 25° C. during heating, the energy-saving temperature t is set to 20° C. The energy-saving outside-temperature-side limit temperature tc1 is set to 19° C. or the like, and the energy-saving counter-outside-temperature-side limit temperature tc2 is set to 21° C. or the like. In this way, the temperature of the room A is controlled within the energy-saving temperature range Δt in energy-saving conditioning mode. As a result, load is reduced in energy-saving conditioning mode, compared to that in ordinary conditioning mode. The above temperatures of the room A are given as an example to simplify the explanation.

(Overall Process)

Figure 12:
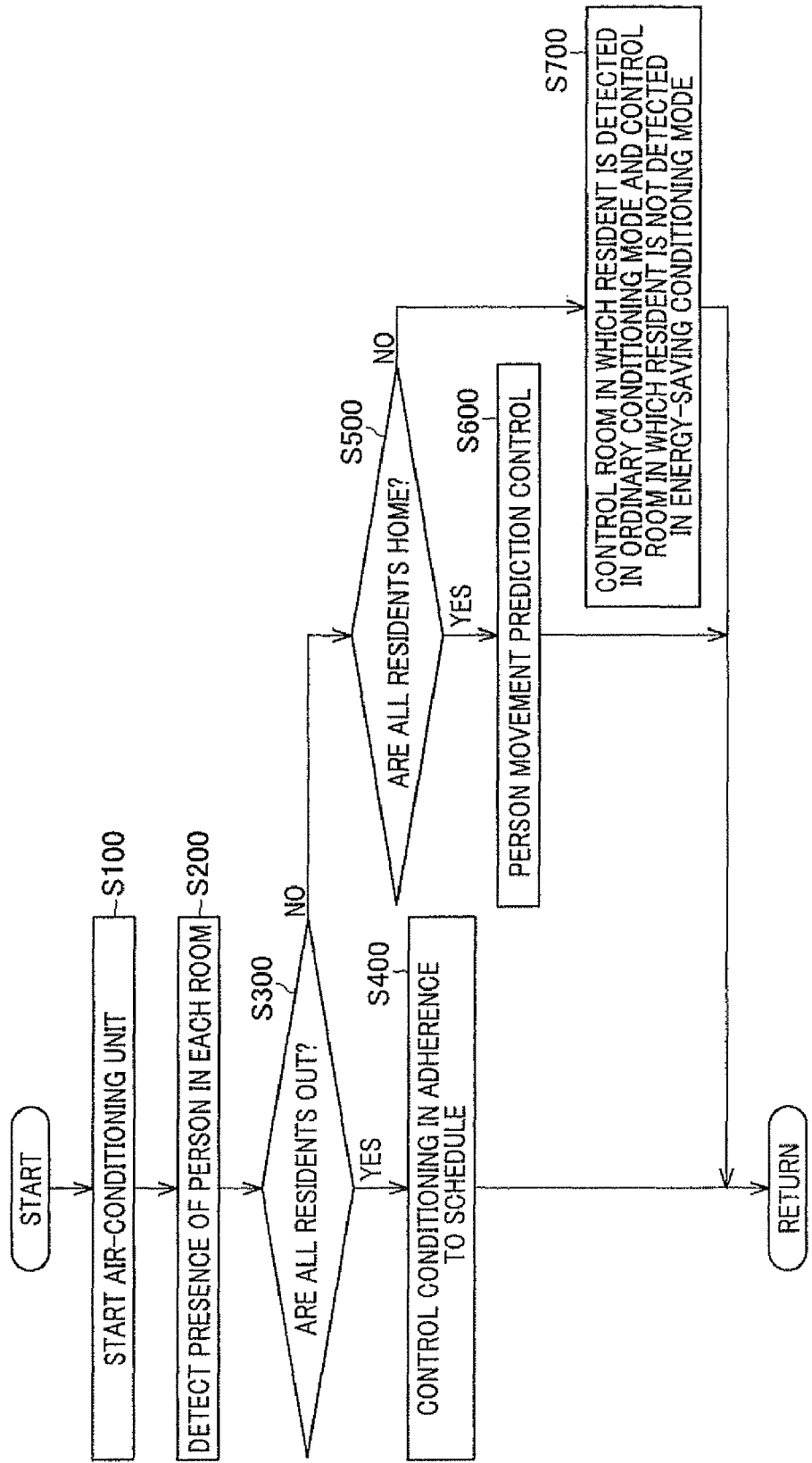
FIG. 12 is a diagram of the flow of an overall process of the central air-conditioning system according to the first embodiment.

First, the flow of an overall process performed by the central air-conditioning system 10 will be described with reference to FIG. 12.

When the central air-conditioning system 10 is turned ON, the controller 60 performs an air-conditioning unit startup process for starting the air-conditioning unit 12 (S100). When the air-conditioning unit 12 is started, the controller 60 performs a presence checking process for detecting the presence of the person 70 in each room A to D (S200). In the presence checking process, whether the person 70 is present in any of the rooms A to D is detected. The controller 60 detects whether the person 70 is present for each room A to D based on the electrical signal outputted from each person detecting unit 51 to 54 provided in each room A to D.

The controller 60 judges whether all residents are out based on the electrical signals outputted from the person detecting units 51 to 54 (S300). When the controller 60 judges that all residents are out (Yes at S300), the controller 60 controls the temperature of each room A to D based on the temperature control schedule stored in the schedule storage section 63 (S400). On the other hand, when the controller 60 judges that not all residents are out, namely a resident is home (No at S300), the controller 60 judges whether all residents are home (S500). In this instance, the controller 60 may judge that all residents are home based on output from the person detecting units 51 to 54. Alternatively, for example, a person detecting unit may be provided at the front door of the house 11. Whether all residents are home can be judged by detection of people entering and exiting the house 11.

When the controller 60 judges that all residents are home in the house 11 (Yes at S500), the controller 60 proceeds to person movement prediction control, described hereafter (S600). On the other hand, when the controller 60 judges that not all residents are home in the house 11 (NO at S500), the controller 60 controls the temperatures of the plurality of rooms A to D based on whether a resident is present or absent (S700). Specifically, at S700, the controller 60 controls the temperature of a room in which a resident is detected to the ordinary set temperature T in ordinary conditioning mode and controls the temperature of a room in which a resident is not detected to the energy-saving temperature t in energy-saving conditioning mode.

Figure 13:
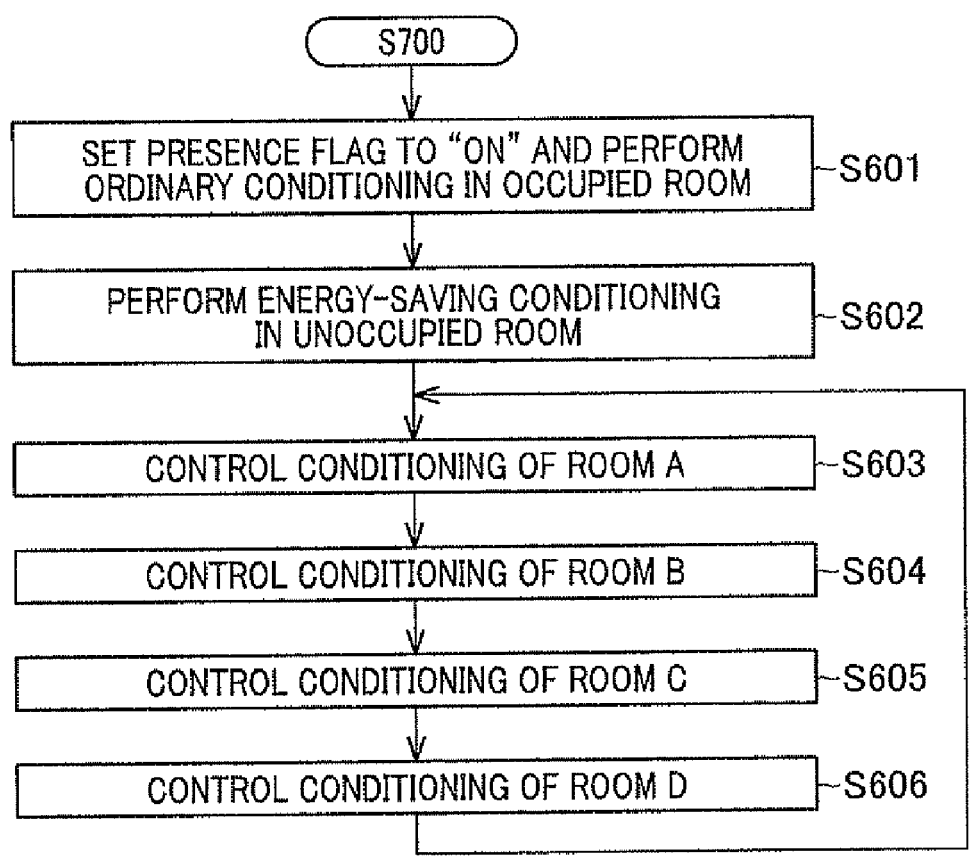
FIG. 13 is a diagram of the flow of an overall process for person movement prediction control in the central air-conditioning system according to the first embodiment.

In the control performed at S700, as shown in FIG. 13, the controller 60 turns "ON" a presence flag for an occupied room in which the person 70 has been detected at S200 and performs an ordinary conditioning process for performing ordinary conditioning to control the temperature of the occupied room to the ordinary set temperature T (S601). On the other hand, the controller 60 performs an energy-saving conditioning process for performing energy-saving conditioning to control the temperature to the energy-saving temperature t in an unoccupied room in which the person 70 has not been detected at S200 (S602). Then, after performing the ordinary conditioning process at S601 and the energy-saving conditioning process at S602, the controller 60 proceeds to individual room conditioning control processes for controlling the temperatures separately for each room A to D (S603 to S606). The controller 60 repeats the individual room conditioning control processes at S603 to S606 until the state of the residents in the house 11 changes.

(Individual Room Conditioning Control Processes)

Figure 14:
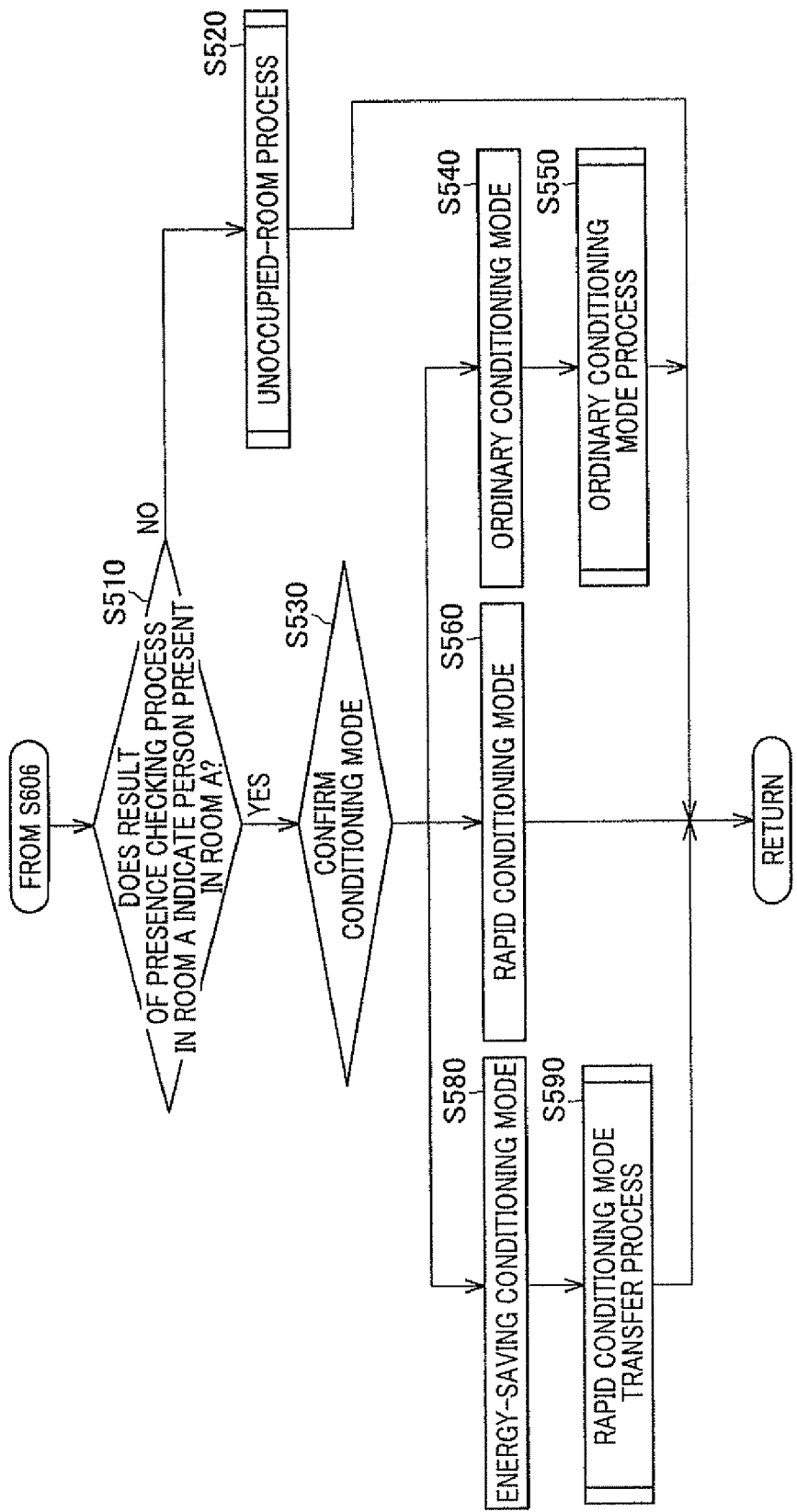
FIG. 14 is a diagram of the flow of a conditioning control process for the room A in the central air-conditioning system according to the first embodiment.

Next, the flow of the individual room conditioning control processes will be described with reference to FIG. 14.

Here, the flow of a room A conditioning control process at S603 will be described with reference to FIG. 14. The room B conditioning control process at S604, the room C conditioning control process at S605, and the room D conditioning control process at S606 are essentially the same as the room A conditioning control process. Explanations thereof are omitted.

When the room D conditioning control process at Step S606 is completed, the controller 60 returns to S603 and proceeds to the room A conditioning control process. In the room A conditioning control process, the controller 60 performs the presence checking process in the room A serving as the target room and judges whether the person 70 is present in the room A (S510). Details of the presence checking process will be described hereafter.

When the controller 60 judges that the person 70 is not present in the room A at S510 (No at S510), the controller 60 proceeds to an unoccupied-room process (S520). On the other hand, when the controller 60 judges that the person 70 is present in the room A (Yes at S510), the controller 60 performs a conditioning mode confirmation process for confirming the conditioning mode of the room A (S530). Here, when the controlling room 60 judges that the person 70 is present in the room A at S510 and the conditioning mode confirmed at S530 is ordinary conditioning mode (S540), the controller 60 proceeds to an ordinary conditioning mode process for continuing operation in ordinary conditioning mode (S550). In other words, when the conditioning mode confirmed at S530 is ordinary conditioning mode, the person 70 remains present in the room A and the temperature is controlled to the ordinary set temperature T as a result of the operation in ordinary conditioning mode. Therefore, the controller 60 performs the ordinary conditioning mode process for continuing the operation in ordinary conditioning mode.

On the other hand, when the controller 60 judges that the person 70 is present in the room A at S510 and the conditioning mode confirmed at S530 is rapid conditioning mode (S560), the controller 60 proceeds to S604 of the overall flow shown in FIG. 13. In other words, when the conditioning mode confirmed at S530 is rapid conditioning mode, rapid conditioning is continued in the room A. Therefore, the controller 60 proceeds to perform control for the room B at S604 while maintaining conditioning of the room A in rapid conditioning mode. When the controller 60 judges that the person 70 is present in the room A at S510 and the conditioning mode confirmed at S530 is energy-saving conditioning mode (S580), the controller 60 proceeds to a rapid conditioning mode transfer process for switching the operation from energy-saving conditioning mode to rapid conditioning mode (S590). In other words, when the conditioning mode confirmed at S530 is energy-saving conditioning mode, the room A is at a state of transition from a state in which the temperature is controlled to the energy-saving temperature t having a lower load than the ordinary set temperature T and closer to the outside temperature to a state in which the temperature is controlled to the ordinary set temperature T. Therefore, the controller 60 performs the rapid conditioning mode transfer process for switching the operation from energy-saving conditioning mode to rapid conditioning mode. When the controller 60 completes the process for the room A by performing any of the unoccupied-room process at S520, the ordinary conditioning mode process at S550, or the rapid conditioning mode transfer process at S590, the controller 60 proceeds to the process for the room B at S700.

(Presence Checking Process)

Figure 15:
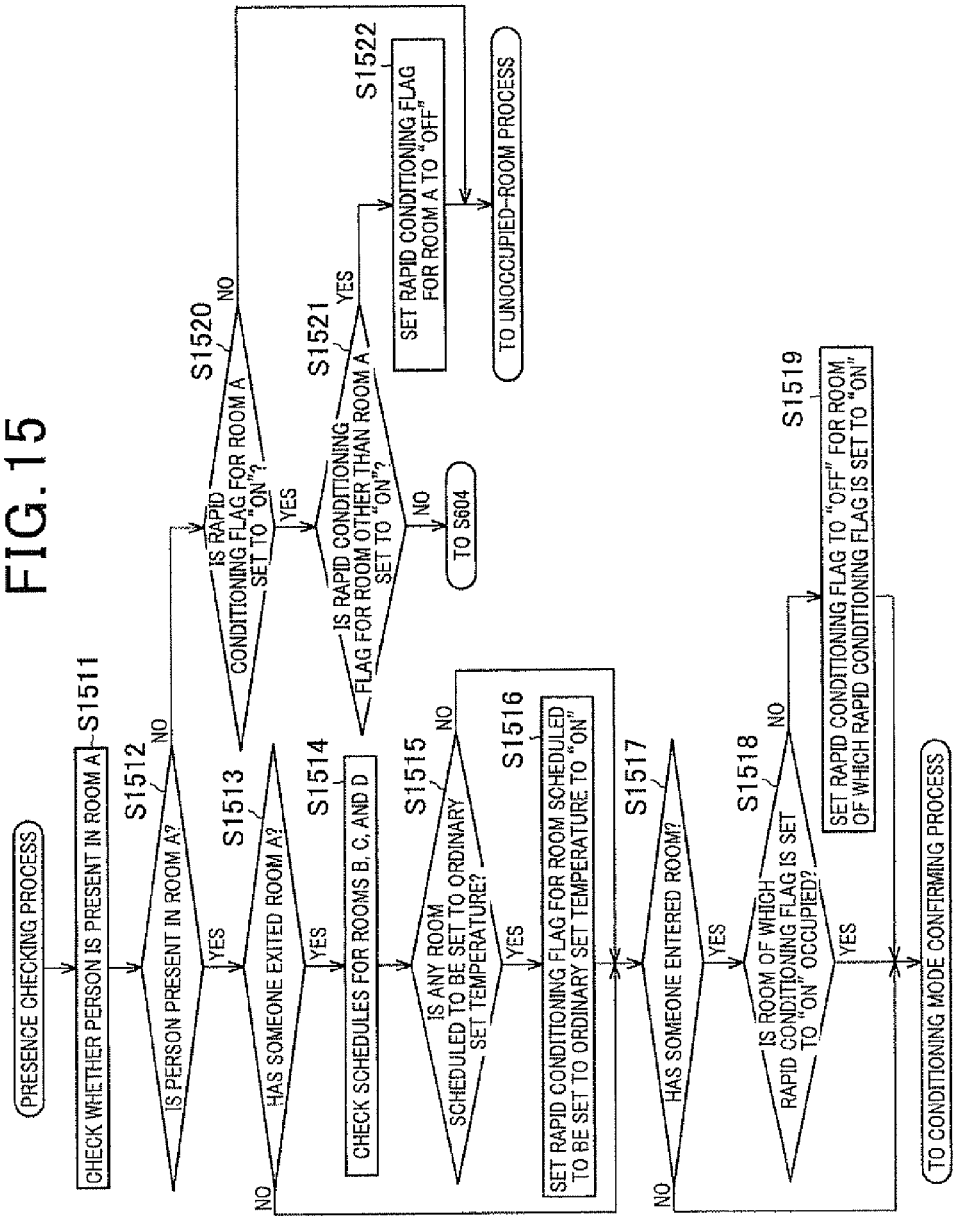
FIG. 15 is a diagram of the flow of a presence checking process for the room A in the central air-conditioning system according to the first embodiment.

Next, the presence checking process at S510, including the human movement prediction control at S600, will be described in detail with reference to FIG. 15.

When the controller 60 proceeds to the presence checking process at S510, the controller 60 checks whether the person 70 is present in the room A that is the target room (S1511). In other words, the controller 60 checks the occupancy of the room A. As a result checking the presence of the person 70 at S1511, the controller 60 judges whether the person 70 is present in the room A (S1512). When the controller 60 judges that the person 70 is present in the room A as a result of judging whether the person 70 is present in the room A (Yes at S1512), the controller 60 judges whether someone has exited the room A (S1513). The controller 60 judges whether someone has exited through the doorway 82 in the room A using the peak temperatures in the monitoring areas 71 to 77.

When the controller 60 judges that someone has exited the room A (Yes at Step A1513), the controller 60 checks the temperature control schedules of the rooms B to D that are non-target rooms other than the room A that is the target room (S1514). The controller 60 checks the temperature control schedules of the rooms B to D based on the temperature control schedule stored in the schedule storage section 63. Then, from the checked temperature control schedules, the to controller 60 judges whether the temperature of any of the rooms B to D should be set to the ordinary set temperature T at the current time clocked by the clock section 64 (S1515). In other words, the controller 60 checks whether any room is set to ordinary conditioning mode.

When the controller 60 judges at S1515 that the temperature of any of room B, room C, or room D is set to the ordinary set temperature T at the current time (Yes at S1515), the controller 60 sets a rapid conditioning flag for the room D of which the temperature is set to the ordinary set temperature T to "ON" (S1516). According to the first embodiment, the temperature of the room D is set to the ordinary set temperature T. In other words, the room D is equivalent to a specific non-target room in the scope of claims. The room B and the room C are equivalent to excluded rooms in the scope of claims.

When the controller 60 judges that no one has exited the room A at S1513 (No at S1513) or sets the rapid conditioning flag for the room D that is the specified non-target room to "ON" at S1516, the controller 60 judges whether someone has entered the room A (S1517). When the controller 60 judges that someone has entered the room A (Yes at S1517), the controller 60 judges whether the room of which the rapid conditioning flag is set to "ON" at S1516, namely the room D, is occupied (S1518). When the controller 60 judges that the room D is occupied at S1518 (Yes at S1518), the controller 60 completes the presence checking process and proceeds to the conditioning mode confirmation process at S530 in FIG. 14. On the other hand, when the controller 60 judges that the room D is unoccupied at S1518 (No at S1518), the controller 60 sets the rapid conditioning flag for the room D to "OFF" (S1519). When the controller 60 judges that no one has entered the room A at S1517 and the rapid conditioning flag for room D is set to "OFF" at S1519, the controller 60 proceeds to the conditioning mode confirmation process at S530.

When someone exiting the room A is confirmed, the resident that has exited the room A may move to any of the rooms B to D. At this time, the temperatures of the rooms B to D that are unoccupied by residents are controlled to the energy-saving temperature t by, for example, the process at S602. Therefore, when the resident that has exited the room A enters the room B to D of which the temperatures are controlled to the energy-saving temperature t, the resident may experience discomfort. Therefore, when someone exiting the room A is confirmed, the controller 60 predicts that the possibility of the resident who has exited the room A moving to a room, among the rooms B to D, set to be conditioned in the ordinary conditioning mode at the current time is high. In other words, because the temperature control schedule is set in adherence to the resident's lifestyle, the possibility of the resident moving to a room that is not set to be conditioned in ordinary conditioning mode is low. Therefore, when the controller 60 confirms the exit of the resident from the room A at S1513, the controller 60 predicts that the possibility of the resident who has exited the room A moving to the room D is high. The controller 60 sets the rapid conditioning flag for the room D to "ON" at S1516. As a result, rapid conditioning is started in the room D by procedures described hereafter, and the temperature of the room D is controlled to a temperature near the comfortable ordinary set temperature T until the resident who has exited the room A enters the room D.

However, the resident who has exited the room A may have exited the room, for example, to perform housework or to use the bathroom, and may not necessarily move to the room D. Therefore, the controller 60 checks whether someone has entered the room A at S1517 after confirming that someone has exited the room A. When the controller 60 confirms that someone has entered the room A, the controller 60 checks whether the resident has entered the room D of which the rapid conditioning flag is set to "ON" at S1518. At this time, when the resident is not confirmed to have entered the room D, the controller 60 sets the rapid conditioning flag for room D to "OFF" at S1519. In other words, the controller 60 judges that the resident confirmed to have exited the room A at S1513 has reentered the room A at S1517. Therefore, when the entrance of the resident into the room D is confirmed, rapid conditioning of the room D is continued without the rapid conditioning flag being set to "OFF". On the other hand, when the entrance of the resident into the room D is not confirmed, the rapid conditioning flag for the room D is set to "OFF". As a result, energy-saving measures can be promoted while increasing comfort in the room D.

When the controller 60 judges that the person 70 is not present in the room A at S1512 (No at S1512), the controller 60 judges whether the rapid conditioning flag for the room A is set to "ON" (S1520). When the controller 60 judges that the rapid conditioning flag for the room A is "ON" at S1520 (Yes at S1520), the controller 60 judges whether the rapid conditioning flag for a room other than the room A is set to "ON" (S1521). When the controller 60 judges that the rapid conditioning flag is not set to "ON" for a room other than the room A at S1521 (No at S1521), the controller 60 proceeds to S604 shown in FIG. 13 and performs control in which the room B is the target room. On the other hand, when the controller 60 judges that the rapid conditioning flag is set to "ON" for a room other than the room A (Yes at S1521), the controller 60 sets the rapid conditioning flag for the room A to "OFF" (S1522). In other words, when the resident is not present in the room A at S1512 and the rapid conditioning flag for another room is set to "ON" regardless of the rapid conditioning flag for the room A being set to "ON", the controller 60 sets the rapid conditioning flag for the room A to "OFF" to prioritize rapid conditioning of the other room over the room A. When the controller 60 sets the rapid conditioning flag for the room A to "OFF" at S1522 or judges that the rapid conditioning flag for the room A is set to "OFF" at S1520 (No at S1520), the controller 60 judges that the resident is not present in the room A and proceeds to the unoccupied-room process described hereafter.

(Unoccupied-Room Process)

Figure 16:
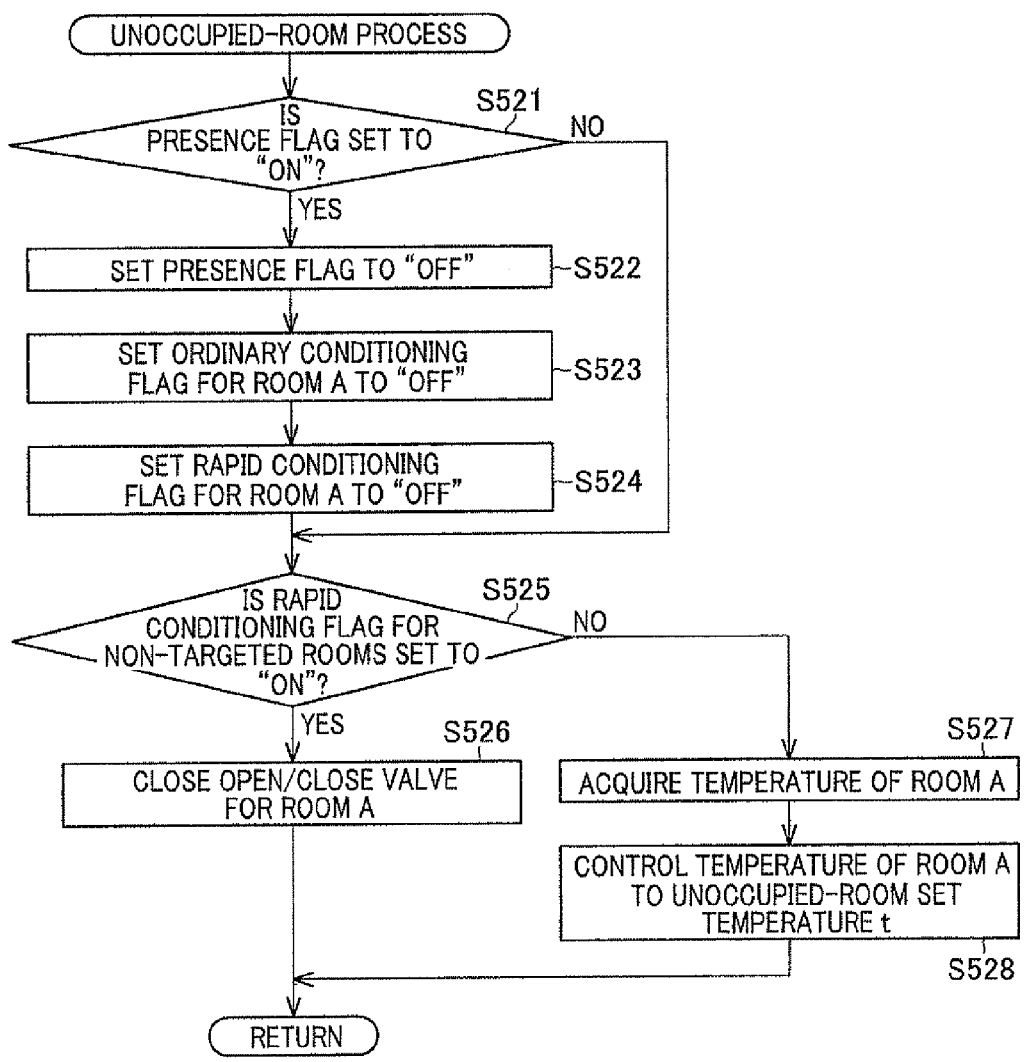
FIG. 16 is a diagram of the flow of an unoccupied-room process for the room A in the central air-conditioning system according to the first embodiment.

The flow of the above-mentioned unoccupied-room process at S520 will be described with reference to FIG. 16.

When the controller 60 judges that the person 70 is not in the room A in the presence checking process at S510, the controller 60 performs a presence flag checking process for determining whether the presence flag for the room A is set to "ON" (S521). The presence flag indicates the presence of the person 70 in the room A. The presence flag is set to "ON" at S601 when the person 70 is confirmed to be in the room A. Here, in the unoccupied-room process, because the person 70 is determined to be absent from the room A in the presence checking process at S510, the controller 60 sets the presence flag to "OFF" (S522). In other words, when the person 70 is initially confirmed to be in the room A but subsequently exits the room A, the controller 60 sets the presence flag for the room A to "OFF" at S522.

When the controller 60 sets the presence flag for the room A to "OFF" at S522, the controller 60 also sets an ordinary conditioning flag for the room A to "OFF" (S523). The ordinary conditioning flag is set to "ON" when ordinary conditioning is required to be performed in a room to be controlled. However, when the person 70 is not in the room A that is to be controlled herein, ordinary conditioning is not required to be continued in the room A. Therefore, the controller 60 sets the presence flag for the room A to "OFF" at S522 and also sets the ordinary conditioning flag for the room A to "OFF". Furthermore, the controller sets the rapid conditioning flag for the room A to "OFF". When the person 70 is not in the room A, the operation at the room A proceeds to an energy-saving conditioning process corresponding to when the room A is unoccupied. Therefore, the controller 60 sets the ordinary conditioning flag for the room A to "OFF" and also sets the rapid conditioning flag to "OFF".

When the controller 60 judges that the presence flag for the room A is set to "OFF" at S521 (No at S521) or sets the rapid conditioning flag to "OFF" at S524, the controller 60 determines whether the rapid conditioning flag for the non-target rooms other than the room A is set to "ON" (S525). When the controller 60 is performing the room A conditioning control process at S603 shown in FIG. 13, the room A is the target room, and the rooms B to D other than the room A are the non-target rooms. The controller 60 judges whether the rapid conditioning flag for any of the non-target rooms is set to "ON". When there is a plurality of rooms A to D as in the house 11, the conditioning state differs with each room. Therefore, the controller 60 judges whether rapid conditioning is performed in any of the rooms B to D other than the room A as described above.

When the controller 60 judges that the rapid conditioning flag for any of the non-target rooms is set to "ON" at S525 (Yes at S525), the controller 60 closes the open/close valve 31 in the air-conditioner duct 21 connected to the room A (S526). As a result, conditioning of the room A is stopped, and the supply of cold air or warm air to the other room in which rapid conditioning is being performed is accelerated. On the other hand, when the controller 60 judges that the rapid conditioning flag for none of the non-target rooms is set to "ON" at S525 or, in other words, the rapid conditioning flags are "OFF" (No at S525), the controller 60 acquires the temperature of the room A (S527). The controller 60 acquires the temperature of the room A from the temperature sensor 41 provided in the room A. Then, the controller 60 compares the temperature of the room A acquired at S527 with the energy-saving temperature t of the room A and controls the temperature of the room A to the energy-saving temperature t. The controller 60 controls the temperature of the room A to the energy-saving temperature t by opening and closing the open/close valve 31 in the air-conditioner duct 21.

When the controller 60 closes the air-conditioner duct 21 connected to the room A using the open/close valve 31 at S526 or controls the temperature of the room A to the energy-saving temperature t at S528, the controller 60 completes the process for the room A and proceeds to the conditioning control for the room B at S600.

(Conditioning Mode Confirmation Process)

Next, details of the flow of the conditioning mode confirmation process at S530 in FIG. 14 will be described with reference to FIG. 17.

When the controller 60 judges that the person 70 is in the room A in a person detecting process (or human detecting process) at S510, the controller 60 judges whether the ordinary conditioning flag for the room A is set to "ON" (S531). When the controller 60 judges that the ordinary conditioning flag for the room A is set to "ON" (Yes at S531), the controller 60 proceeds to S540 and continues conditioning the room A in ordinary conditioning mode to continue ordinary conditioning of the room A. On the other hand, when the controller 60 judges that the ordinary conditioning flag for the room A is not set to "ON" at S531 (No at S531), the controller 60 judges whether the temperature of the room A is within the ordinary temperature range $\Delta t$ (S532). The controller 60 acquires the temperature of the room A from the temperature sensor 41 in the room A. Then, the controller 60 judges whether the acquired temperature is within the ordinary temperature range $\Delta T$ or, in other words, between the ordinary outside-temperature-side limit temperature Tc1 and the ordinary counter-outside-temperature-side limit temperature Tc2.

When the controller 60 judges that the temperature of the room A is within the ordinary temperature range $\Delta T$ (Yes at S532), the controller 60 sets the ordinary conditioning flag for performing ordinary conditioning in the room A to "ON" (S533) and sets the rapid conditioning flag for performing rapid conditioning in the room A to "OFF" (S534). Then, after the controller 60 sets the ordinary conditioning flag for the room A to "ON" in S533 and sets the rapid conditioning flag for the room A to "OFF" in S535, the controller 60 proceeds to S540 and continues conditioning the room A in ordinary conditioning mode.

When the controller 60 judges that the temperature of the room A is not within the ordinary temperature range $\Delta T$ at S532 (No at S532), the controller 60 judges whether the rapid conditioning flag for the room A is set to "ON" (S535). When the temperature of the room A is not within the ordinary temperature range $\Delta T$, rapid conditioning is required to be performed to change the temperature of the room A to the ordinary set temperature T1. In this instance, when a judgment is made in the preceding process that rapid conditioning of the room A is required to be performed and the rapid conditioning flag for the room A is set to "ON", the conditioning mode for the room A has already changed to the rapid conditioning mode. The rapid conditioning flag is not required to be set to "ON" again. The controller 60 judges whether the rapid conditioning flag for the room A is set to "ON" at S535. When the rapid conditioning flag is set to "ON" (Yes at S535), the controller 60 judges that the operation is in rapid conditioning mode and proceeds to S560. When the rapid conditioning flag is not set to "ON" (No at S535), the controller 60 judges that the operation is in energy-saving conditioning mode and proceeds to S580. The controller 60 proceeds to the rapid conditioning mode transfer process at S590 to perform rapid conditioning of the room A.

(Rapid Conditioning Mode Transfer Process)

Figure 18:
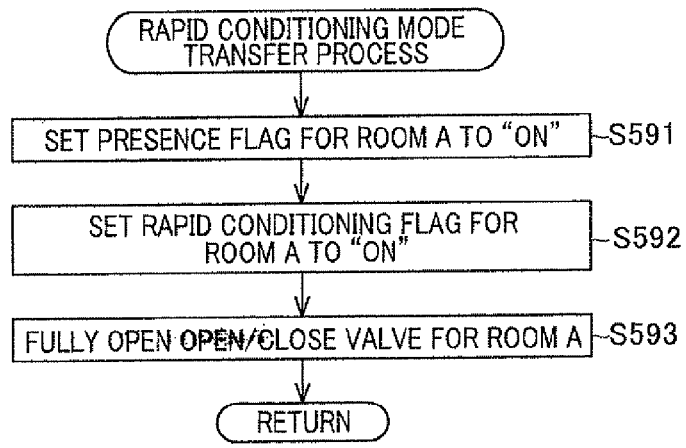
FIG. 18 is a diagram of the flow of a rapid conditioning mode transfer process for the room A in the central air-conditioning system according to the first embodiment.

The flow of the rapid conditioning mode transfer process will be described with reference to FIG. 18.

Figure 17:
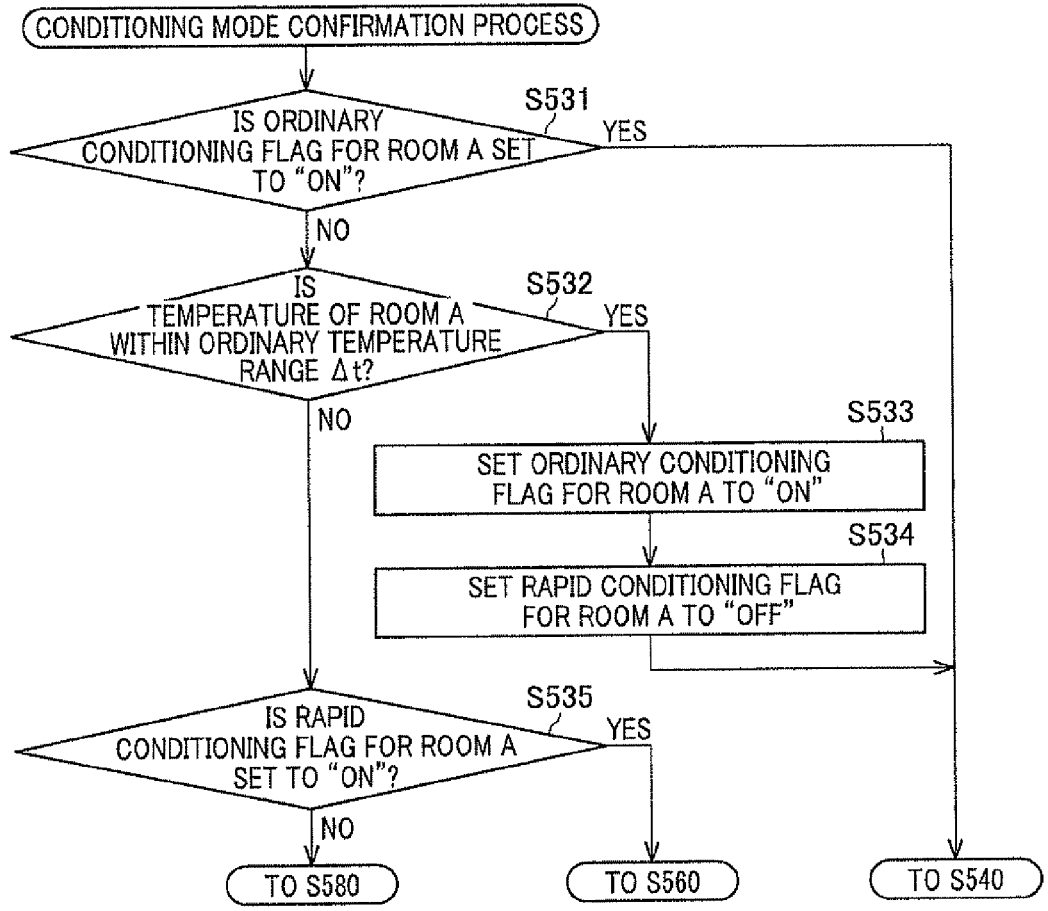
FIG. 17 is a diagram of the flow of a conditioning mode confirmation process for the room A in the central air-conditioning system according to the first embodiment.

When the rapid conditioning flag for the room A is not set to "ON" at S535 in FIG. 17, the controller 60 proceeds to the rapid conditioning mode transfer process as described above. When the person 70 is confirmed to have entered the room A at S510, the controller 60 sets the presence flag for the room A indicating the presence of the person 70 to "ON" (S591). Then, to change the operation in the room A to rapid conditioning mode, the controller 60 sets the rapid conditioning flag for the room A to "ON" (S592). Furthermore, the controller 60 fully opens the open/close valve 31 in the air-conditioner duct 21 connected to the room A to perform rapid conditioning of the room A (S593).

(Ordinary Conditioning Mode Process)

Figure 19:
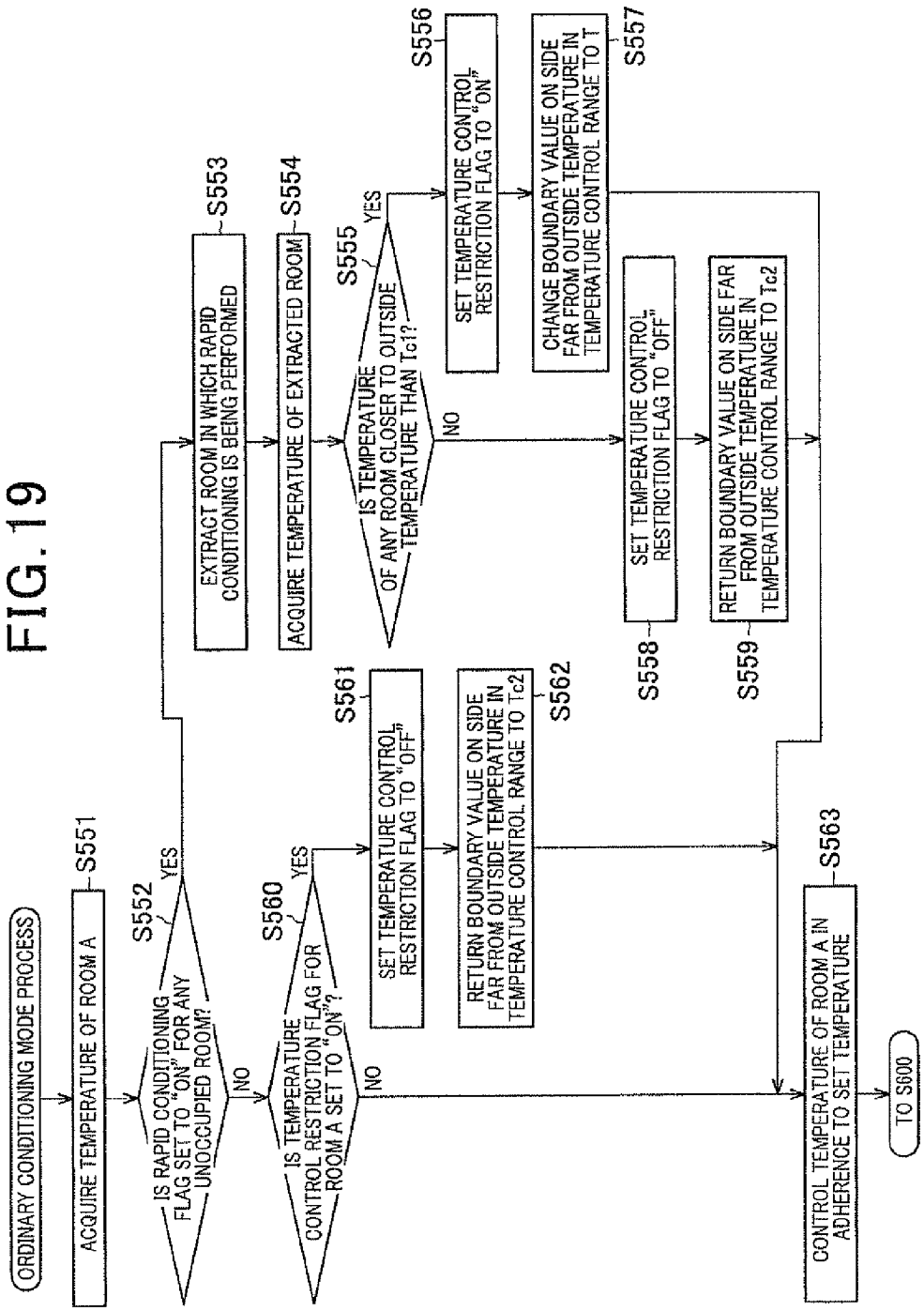
FIG. 19 is a diagram of the flow of an ordinary conditioning mode process for the room A in the central air-conditioning system according to the first embodiment.

The flow of the ordinary conditioning mode process will be described with reference to FIG. 19.

When the controller 60 judges that the ordinary conditioning flag for the room A is set to "ON" at S531 (Yes at S531) and judges that the temperature of the room A is within the ordinary temperature range ΔT at S532 (Yes at S532) in FIG. 17, the controller 60 proceeds to the ordinary conditioning mode process.

When the controller 60 judges that the ordinary conditioning mode process is being performed for the room A in the conditioning mode confirmation process shown in FIG. 17, the controller 60 acquires the temperature of the room A (S551). The controller 60 acquires the temperature of the room A from the temperature sensor 41 provided in the room A. When the controller 60 acquires the temperature of the room A at S551, the controller 60 judges whether the rapid conditioning flag for any of the non-target rooms is set to "ON" (S552). In other words, the controller 60 judges whether the rapid conditioning flag is set to "ON" for any of the rooms B to D that are the non-target rooms other than the room A that is the target room. Still in other words, the controller 60 judges whether rapid conditioning is performed in any of the non-target rooms. For example, when the person 70 is present in the room A, another person 70 may enter another room B to D. When the person 70 is present only in the room A, the room A is conditioned in ordinary conditioning mode, and the other rooms B to D are conditioned in energy-saving conditioning mode. Here, when another person 70 enters a room B to D, the operation in the room B to D into which the person 70 has entered changes to rapid conditioning mode. Therefore, when the operation in the room A that is the target room is in ordinary conditioning mode, the controller 60 judges whether rapid conditioning is performed in any of the other non-target rooms.

When the controller 60 judges that the rapid conditioning flag is set to ON for an non-target room at S552 (YES at S552), the controller 60 extracts the room in which rapid conditioning is being performed from among the rooms B to D that are the non-target rooms (S553). Here, as an example, rapid conditioning is being performed in the room C. When the controller 60 extracts the room in which rapid conditioning is being performed, the controller 60 acquires the temperature (room temperature) of the room extracted as the room in which rapid conditioning is being performed (S554). In other words, the controller 60 acquires the temperature of the room C from the temperature sensor 43 provided in the room C. The controller 60 judges whether the temperature of any of the extracted rooms is closer to the outside temperature than the ordinary outside-temperature-side limit temperature Tc1 of the room A that is the target room (S555). In other words, the controller 60 compares the temperature of the extracted room C with the ordinary outside-temperature-side limit temperature Tc1 of the room A that is the target room. The controller 60 judges whether the temperature of the room C is closer to the outside temperature than the ordinary outside-temperature-side limit temperature Tc1 of the room A. For example, the controller 60 judges whether the temperature of the room C is higher than the ordinary outside-temperature-side limit temperature Tc1 of the room A during cooling, and judges whether the temperature of the room C is lower than the ordinary outside-temperature-side limit temperature Tc1 of the room A during heating.

When the controller 60 judges that the temperature of a room among the extracted rooms is closer to the outside temperature than the ordinary outside-temperature-side limit temperature Tc1 of the room A (Yes at S555), the controller 60 sets a temperature control restriction flag for the room A that is the target room to "ON" (S556). In other words, when the temperature of the extracted room C is closer to the outside temperature than the ordinary outside-temperature-side limit temperature Tc1 of the room A, the controller 60 sets the temperature control restriction flag for the room A to "ON". For example, the controller 60 sets the temperature control restriction flag for the room A to "ON" when the temperature of the room C is higher than the ordinary outside-temperature-side limit temperature Tc1 during cooling, and when the temperature of the room C is lower than ordinary outside-temperature-side limit temperature Tc1 during heating.

The controller 60 then changes a boundary value Bf on the side far from the outside temperature, in the range within which the temperature of the room A is controlled, to the ordinary set temperature T (S557). When the controller 60 conditions the room A in ordinary conditioning mode, the controller 60 performs conditioning using the temperatures from the ordinary outside-temperature-side limit temperature Tc1 to the ordinary counter-outside-temperature-side limit temperature Tc2, with the ordinary set temperature T therebetween, as the ordinary temperature range ΔT. Here, when the temperature control restriction flag is set to "ON" at S556, the controller 60 changes the boundary value Bf on the side far from the outside temperature, in the range within which the temperature of the room A is controlled, to the ordinary set temperature T even when conditioning the room A in ordinary conditioning mode. For example, when cooling is performed in the room A with the ordinary set temperature T at 25° C., the temperature of the room A is controlled within the ordinary temperature range ΔT from the ordinary outside-temperature-side limit temperature Tc1 of 26° C. to the ordinary counter-outside-temperature-side limit temperature Tc2 of 24° C. In this instance, when the temperature control restriction flag is set to "ON", the boundary value Bf on the side far from the outside temperature in the range within which the temperature of the room A is controlled is set to 25° C. that is the ordinary set temperature T. In other words, Bf=25° C. As a result, when the ordinary set temperature T is 25° C. during cooling in the room A, the temperature of the room A is controlled between 25° C. and 26° C. with 25° C. serving as the lower limit. When heating of the room A is performed with the ordinary set temperature T at 25° C., the temperature of the room A is controlled within the ordinary temperature range ΔT from the ordinary outside-temperature-side limit temperature Tc1 of 24° C. to the ordinary counter-outside-temperature-side limit temperature Tc2 of 26° C. In this instance, when the temperature control restriction flag is set to "ON", the boundary value Bf on the side far from the outside temperature in the range within which the temperature of the room A is controlled is set to 25° C. that is the ordinary set temperature T. In other words, Bf=25° C. As a result, when the ordinary set temperature T is 25° C. during heating in the room A, the temperature of the room A is controlled between 24° C. and 25° C. with 25° C. serving as the upper limit.

When the controller 60 judges that no room among the extracted rooms has a temperature closer to the outside temperature than the ordinary outside-temperature-side limit temperature Tc1 of the room A at S555 (No at S555), the controller 60 sets the temperature control restriction flag for the room A that is the target room to "OFF" (S558). In other words, when the temperature of the extracted room C is farther from the outside temperature than the ordinary outside-temperature-side limit temperature Tc1 of the room A, the controller 60 sets the temperature control restriction flag for the room A to "OFF". For example, the controller 60 sets the temperature control restriction flag for the room A to "OFF" when the temperature of the room C is lower than the ordinary outside-temperature-side limit temperature Tc1 during cooling, and when the temperature of the room C is higher than the ordinary outside-temperature-side limit temperature Tc1 during heating. Then, the controller 60 returns the boundary value Bf on the side far from the outside temperature in the range within which the temperature of the room A is controlled to the ordinary counter-outside-temperature-side limit temperature Tc2 (S559). In other words, the controller 60 controls the temperature of the room A with the ordinary counter-outside-temperature-side limit temperature Tc2 serving as the boundary value Bf on the side far from the outside temperature for the room A in a usual manner.

When the controller 60 judges that the rapid conditioning flag is not set to "ON" for any of the non-target rooms at S552 (No at S552), the controller 60 judges whether the temperature control restriction flag for the room A is set to "ON" (S560). The temperature control restriction flag may be set to "ON" at S556 in the preceding process in the room A. Therefore, when the controller 60 judges that the rapid conditioning flag is not set to "ON" for any of the non-target rooms, the controller 60 judges whether the temperature control restriction flag for the room A is set to "ON". Then, when the controller 60 judges that the temperature control restriction flag for the room A is set to "ON" (Yes at S560), the controller 60 sets the temperature control restriction flag for the room A to "OFF" (S561) and resets the boundary value Bf on the side far from the outside temperature in the range within which the room A is controlled to the ordinary counter-outside-temperature-side limit temperature Tc2 (S562). In other words, when rapid conditioning of the non-target room is completed while conditioning of the room A is being restricted, the controller 60 sets the temperature control restriction flag to "OFF" and resets the boundary value Bf on the side far from the outside temperature to the ordinary counter-outside-temperature-side limit temperature Tc2, in a manner similar to that at S559.

The controller 60 compares the temperature of the room A acquired at S551 and the boundary value Bf set at S557 or the ordinary counter-outside-temperature-side limit temperature Tc2 to which the boundary value Bf is reset at S559 or S562, and performs ordinary conditioning of the room A.

Figure 20:
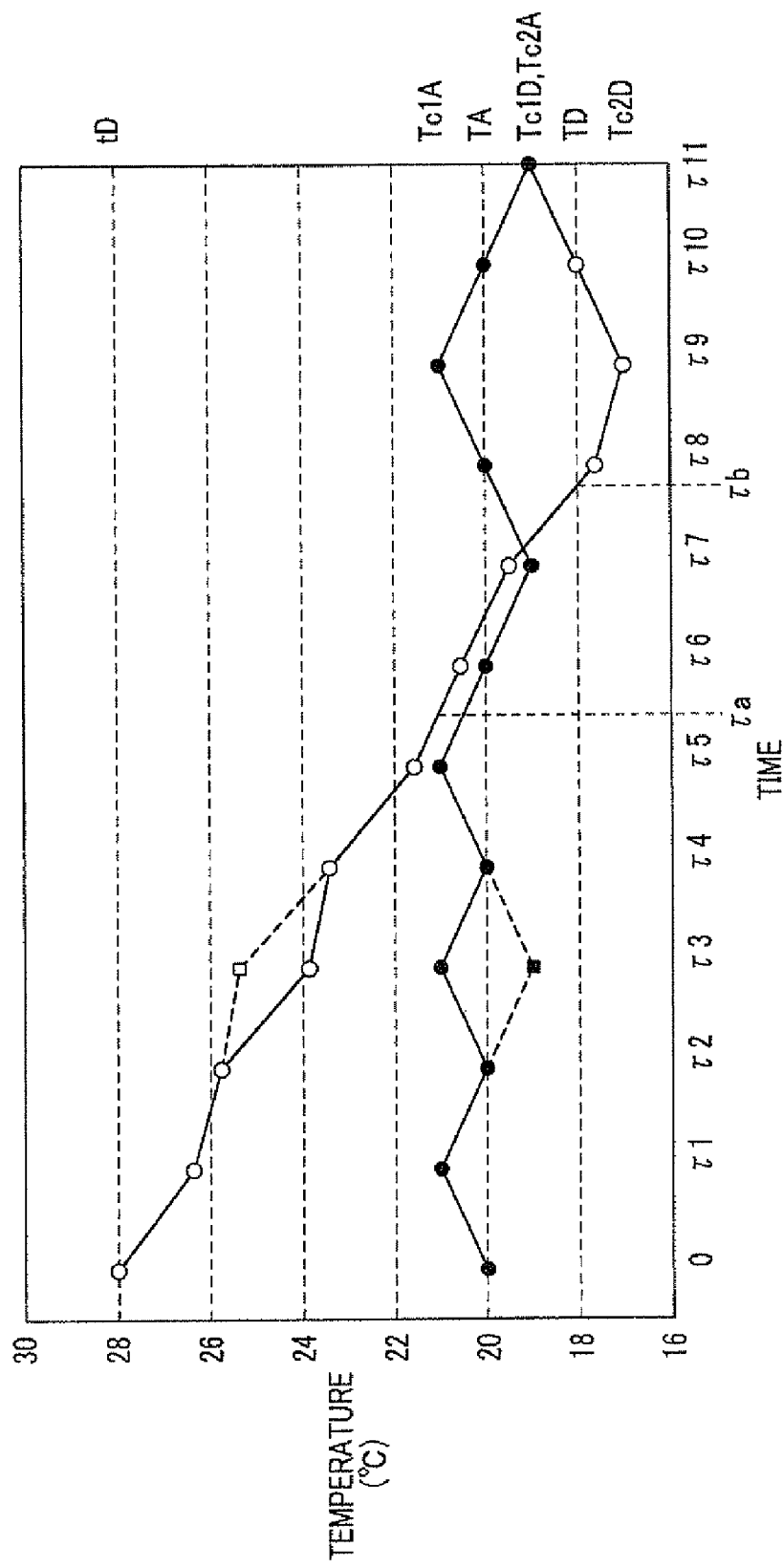
FIG. 20 is a diagram showing temperature changes in the room A and a room D in the central air-conditioning system according to the first embodiment.

Temperature changes that occur during cooling when the above-described ordinary conditioning mode process is performed will be described with reference to FIG. 20. FIG. 20 shows an example of temperature changes in the room A and the room D for explaining the above-described control. In FIG. 20, the room A is the target room. The room D is the room, among the non-target rooms, in which rapid conditioning is performed. In other words, the room D is the room to which a person, among persons 70 present in the room A, moves after exiting the room A. In the example in FIG. 20, the room A and the room D are being cooled. The temperature of the room A that is the target room in which the person 70 is present is set such that an ordinary set temperature TA is 20° C., an ordinary outside-temperature-side limit temperature Tc1A is 21° C., and an ordinary counter-outside-temperature-side limit temperature Tc2A is 19° C. The ordinary conditioning mode process is performed in the room A. On the other hand, the room D is the non-target room to which the person 70 who has exited the room A moves. The person 70 exits the room A and the operation in the room D transitions from energy-saving conditioning mode to rapid conditioning mode, at time T=0 when an energy-saving temperature tD is 28° C. The temperature of the room D is set such that an ordinary set temperature TD is 18° C., an ordinary outside-temperature-side limit temperature Tc1D is 19° C., and an ordinary counter-outside-temperature-side limit temperature Tc2D is 17° C.

At time T=0, the temperature of the room D is the energy-saving temperature tD of 28° C. The temperature of the room A is the ordinary set temperature TA of 20° C. At this time, when the person 70 exits the room A to move to the room D, the operation in the room D transitions to rapid conditioning mode. Therefore, the controller 60 compares the temperature of the room D extracted as the room being operated in rapid conditioning mode and the temperature of the room A. At time T=0, the temperature of the room D is higher than the temperature of the room A that is the target room. Therefore, the controller 60 sets the temperature control restriction flag for the room A to "ON". As a result, the controller 60 sets the lower limit temperature for cooling the room A to TA=20° C. that is the set temperature for the room A. The controller 60 completely closes the open/close valve 31 in the air-conditioner duct 21 connected to the room A and fully opens the open/close valve 33 in the air-conditioner duct 31 connected to the room D. Therefore, the cold air generated by the air-conditioning unit 12 is supplied to the room D in a concentrated manner, as the operation in rapid conditioning mode.

Because the cold air is supplied to the room D in a concentrated manner, the temperature in the room A gradually rises during time T=0 to time T1. On the other hand, the temperature in the room D rapidly drops during time T=0 to time T1. The gradually rising temperature of the room A reaches the ordinary outside-temperature-side limit temperature Tc1A of 21° C. of the room A at time T1. Therefore, the controller 60 opens the open/close valve 31 in the air-conditioner duct 21 connected to the room A and supplies the cold air generated by the air-conditioning unit 12 also to the room A. In other words, the cold air generated by the air-conditioning unit 12 is distributed between the room D being operated in rapid conditioning mode and the room A being operated in ordinary conditioning mode. As a result, the decrease in the temperature of the room D becomes more gradual during time T1 to time T2, compared to that during time T=0 to T1. The temperature of the room A also drops during time T1 to time T2.

At time T2, the temperature of the room A drops to TA=20° C. that is the ordinary set temperature. Here, ordinarily, as indicated by a broken line and the symbol "☐" in FIG. 20, the controller 60 drops the temperature of the room A to the ordinary counter-outside-temperature-side limit temperature Tc2A of 19° C. However, when rapid conditioning is being performed in the room D, the temperature control restriction flag for the room A is set to "ON". The lower limit temperature of the room A is controlled to TA=20° C. that is the ordinary set temperature of the room A. Therefore, when the time is T2 and the temperature of the room A is TA=20° C., the controller 60 completely closes the open/close valve 31 in the air-conditioner duct 21 connected to the room A. As a result, the temperature of the room A rises once again during time T2 to time T3. On the other hand, as a result of the open/close valve 31 in the air-conditioner duct 21 connected to the room A being completely closed, the cold air from the air-conditioning unit 12 is once again supplied to the room D in a concentrated manner during time T2 to time T3. Therefore, the temperature of the room D rapidly drops at the same gradient as that during time T=0 to time T1. When the ordinary temperature control is performed in room A as indicated by the symbol "☐", the change in temperature in the room D becomes gradual as indicated by the broken line and the symbol "☐" in FIG. 20. However, as a result of the lower limit of the temperature control performed in the room A being set to TA=20° C., the cold air is supplied sooner to the room D in a concentrated manner.

At time т3, the temperature of the room A once again reaches Tc1A=21° C. Therefore, the controller 60 fully opens the open/close valve 31 in the air-conditioner duct 21 connected to the room A. Therefore, the temperature of the room A drops to TA=20° C. In the other hand, because the cold air from the air-conditioning unit 12 is distributed between the room A and the room D, the decrease in the temperature of the room D becomes gradual in a manner similar to that during time т1 to time т2. Then, at time т4, the temperature of the room A reaches TA=20° C.

During time т4 to time т6, control is performed in a manner similar to that during time т2 to time т4, described above. Here, at time та following time т5, the temperature of the room D falls below the ordinary outside-temperature-side limit temperature Tc1A of 21° C. of the room A. When the temperature of the room D falls below Tc1A=21° C. (refer to S555), the controller 60 sets the temperature control restriction flag for the room A to "OFF" and sets the lower limit of the temperature control performed in the room A to the ordinary counter-outside-temperature-side limit temperature Tc2A of 19° C. As a result, the controller 60 controls the temperature of the room A in ordinary conditioning mode. As a result, the temperature of the room A is controlled between Tc1A=21° C. and Tc2A=19° C.

On the other hand, at time Tb following time т7, the temperature of the room D drops below the ordinary set temperature TD of 18° C. of the room D. When the temperature of the room D drops below TD=18° C., the controller 60 changes the conditioning mode of room D from rapid conditioning mode to ordinary conditioning mode. As a result, the controller 60 controls the temperature of the room D in ordinary conditioning mode. As a result, the temperature of the room D is controlled between Tc1D=19° C. and Tc2D=17° C.

As a result of the temperatures of the room A and the room D being targeted as described above, the temperature of the room D drops more quickly, although the lower limit of the temperature control performed in the room A during time т2 to time т6 is TA=20° C. that is the ordinary set temperature. Therefore, the temperature of the room D drops more quickly than when ordinary control is performed. As a result, the discomfort experienced by the person 70 who has exited the room A and entered the room D is reduced. In addition, regarding the room A, the lower limit of the temperature control is merely changed from the ordinary counter-outside-temperature-side limit temperature Tc2A of 19° C. to the ordinary set temperature TA of 20° C. Therefore, the person 70 present in the room A barely senses the restricted conditioning performed in accompaniment with rapid conditioning of the room D. As a result, the discomfort experienced by the person 70 present in the room A is not increased.

As described above, according to the first embodiment, the controller 60 performs the monitoring judging process for judging the presence and absence of the person 70 in each room A to D that is the target room, the entrance of the person 70 into each room A to D, and the exit of the person 70 from each room A to D. In other words, the controller 60 judges not only whether the person 70 is present or absent, but whether the person 70 has entered or exited each room A to D. The controller 60 controls the temperature of the room D that is an non-target room other than the room A that is the target room to the energy-saving temperature t, namely in energy-saving conditioning mode, when the person 70 is not detected in the room D, even when the temperature of the room D is scheduled to be controlled to the ordinary set temperature T, namely in ordinary conditioning mode, in the temperature control schedule. At this time, the room D is being controlled in energy-saving conditioning mode regardless of originally being set to be controlled in ordinary conditioning mode, because the person 70 is absent. When the controller 60 judges that the person 70 has exited the room A, the controller 60 conditions the room D in rapid conditioning mode. As a result, the room D is rapidly conditioned such that the temperature changes from the energy-saving temperature t to a temperature near the ordinary set temperature T, by the time the person 70 who has exited the room A enters the room D. On the other hand, the temperature of the room D that is the non-target room is controlled to the energy-saving temperature t until the judgment is made that the person 70 has exited the room A, even when the room D is scheduled to be set to the ordinary set temperature T. Therefore, the room D is conditioned to the energy-saving temperature t when the person is absent from the room D, even when the room D is set to ordinary conditioning mode. In addition, the room D is rapidly conditioned to the ordinary set temperature T when the movement of the person 70 to the room D is predicted because of the exit of the person 70 from the room A. Therefore, unnecessary conditioning of the room D that is set to ordinary conditioning mode can be reduced, and energy consumption can be reduced. Furthermore, comfort of the person 70 entering the room D can be ensured by the movement of the person 70 being predicted.

In addition, according to the first embodiment, the person detecting units 51 to 54 include the thermopile sensors 91 to 97 that respectively detect the temperatures of the monitoring areas 71 to 77. The controller 60 judges the presence or absence of the person 70, and the entrance and exit of the persons 70 and 170 using the peak temperature in each monitoring area 71 to 77 detected by the thermopile sensors 91 to 97. As shown in FIG. 4, when the person 70 is present in the room A, the peak temperature in the monitoring area 73, among the plurality of monitoring areas 71 to 77, rises because of the body temperature of the person 70. As a result, whether the person 70 is present in the room A is detected. Furthermore, the movements of the persons 70 and 170, namely the entrance and exit of the persons, are also judged by the changes in the peak temperature being detected for each monitoring area 71 to 77 in each room A to D. Therefore, the presence or absence, and the entrance and exit of the person 70 for each room A to D can be judged with certainty without requiring a complicated structure.

Furthermore, according to the first embodiment, when the operation in another room C changes to rapid conditioning mode while the room A is being conditioned in ordinary conditioning mode, the controller 60 restricts conditioning of the room A, and supplies the cold air or the warm air in a concentrated manner to the room C in which rapid conditioning is being performed. As a result, the temperature of the room C into which the person 70 has newly entered can be quickly changed without increasing discomfort in the room A in which ordinary conditioning is being performed. Therefore, the discomfort in the room C into which the person 70 has newly entered can be quickly reduced without sacrificing comfort in the room A in which the person 70 is already present.

Second Embodiment

A central air-conditioning system according to a second embodiment will be described. According to the second embodiment, the configuration of the central air-conditioning system is the same as that according to the first embodiment.

However, a process differing from those according to the first embodiment is included. The central air-conditioning system according to the second embodiment will be described focusing on the differences.

The ordinary conditioning mode process according to the second embodiment differs from that according to the first embodiment.

(Ordinary Conditioning Mode Process)

The ordinary conditioning mode process according to the second embodiment will be described with reference to FIG. 21.

When the controller 60 judges that the ordinary conditioning flag for the room A is set to "ON" at S531 in the conditioning mode confirmation process at S530 (Yes at S531) and judges that the temperature of the room A is within the ordinary temperature range ΔT at S532 (Yes at S532) in FIG. 17, the controller 60 proceeds to the ordinary conditioning mode process.

When the controller 60 judges that the ordinary conditioning mode process is being performed for the room A in the conditioning mode confirmation process shown in FIG. 17, the controller 60 acquires the temperature of the room A (S951). The controller 60 acquires the temperature of the room A from the temperature sensor 41 provided in the room A. When the controller 60 acquires the temperature of the room A at S951, the controller 60 judges whether the rapid conditioning flag is set to "ON" for the room B (S952), the room C (S953), and the room D (S954), in sequence. For example, when the person 70 is present in the room A, another person 70 may enter another room B to D. When the person 70 is present only in the room A, the room A is conditioned in ordinary conditioning mode, and the other rooms B to D are conditioned in energy-saving conditioning mode. Here, when a resident exits the room A to move to the room D as according to the first embodiment described above, the operation in the room D changes to rapid conditioning mode at the time the person 70 exits the room A. Therefore, when the operation in the room A that is the target room is in ordinary conditioning mode, the controller 60 judges whether rapid conditioning is being performed, namely the rapid conditioning flag is set to "ON", in the rooms B to D that are the other non-target rooms.

When the rapid conditioning flag for the room B is set to "ON" (Yes at S952), when the rapid conditioning flag for the room C is set to "ON" (Yes at S953), or when the rapid conditioning flag for the room D is set to "ON" (Yes at S954), the controller 60 judges whether the temperature of the room in which rapid conditioning is being performed is closer to the outside temperature than a restricted outside-temperature-side limit temperature Td1 of the room A that is the target room (S955). In other words, when the rapid conditioning flag is set to "ON" for one or more of the rooms B to D (the rapid conditioning flag for the room D is set to "ON" according to the second embodiment), the controller 60 proceeds to an non-target room rapid conditioning priority process and compares the temperature of the room D of which the rapid conditioning flag is set to "ON" with the restricted outside-temperature-side limit temperature Td1 of the room A that is the target room. The controller 60 judges whether the temperature of the room D of which the rapid conditioning flag is set to "ON" is closer to the outside temperature than the restricted outside-temperature-side limit temperature Td1 of the room A. For example, the controller 60 judges whether the temperature of the room D is higher than the restricted outside-temperature-side limit temperature Td1 of the room A during cooling, and judges whether the temperature of the room D is lower than the restricted outside-temperature-side limit temperature Td1 of the room A during heating.

Here, the restricted outside-temperature-side limit temperature Td1 is set to a temperature closer to the outside temperature than the ordinary outside-temperature-side limit temperature Tc1 set for the room A. For example, when the ordinary set temperature T is 25° C. and the ordinary outside-temperature-side limit temperature Tc1 is set to 26° C. during cooling of the room A, the restricted outside-temperature-side limit temperature Td1 is set to 27° C. or the like. When the ordinary set temperature T is 25° C. and the ordinary outside-temperature-side limit temperature Tc1 is set to 23° C. during heating of the room A, the restricted outside-temperature-side limit temperature Td1 is set to 22° C. or the like.

When the controller 60 judges that the temperature of the room B to D (the room D according to the second embodiment) is closer to the outside temperature than the restricted outside-temperature-side limit temperature Td1 of the room A (Yes at S955), the controller 60 proceeds to a temperature comparing process. The controller 60 judges whether a conditioning stop flag for the room A is set to "ON" (S956). When the controller 60 judges that the conditioning stop flag for the room A is set to "OFF" (No at S956), the controller 60 sets the conditioning stop flag for the room A to "ON" (S957). Then, the controller 60 sets a boundary value Bn on the side near the outside temperature, in the range within which the temperature of the room A is controlled, to the restricted outside-temperature-side limit temperature Td1 set in advance for the room A (S958).

On the other hand, the controller 60 sets the boundary value Bf on the side far from the outside temperature, in the range within which the temperature of the room A is controlled, to the ordinary set temperature T set in advance for the room A (S959). Then, the controller 60 closes the air-conditioner duct 21 connected to the room A using the open/close valve 31 to stop conditioning of the room A (S960). In other words, when the conditioning of the room A is stopped, the controller 60 controls the temperature of the room A to a temperature between the boundary value Bn=Td1 on the side near the outside temperature and the boundary value Bf=T on the side far from the outside temperature. More specifically, the controller 60 controls the temperature of the room A to a temperature between the restricted outside-temperature-side limit temperature Td1 and the ordinary set temperature T. After the controller 60 closes the air-conditioner duct 21 connected to the room A using the open/close valve 31, the controller 60 proceeds to control for the room B at S600.

Figure 22:
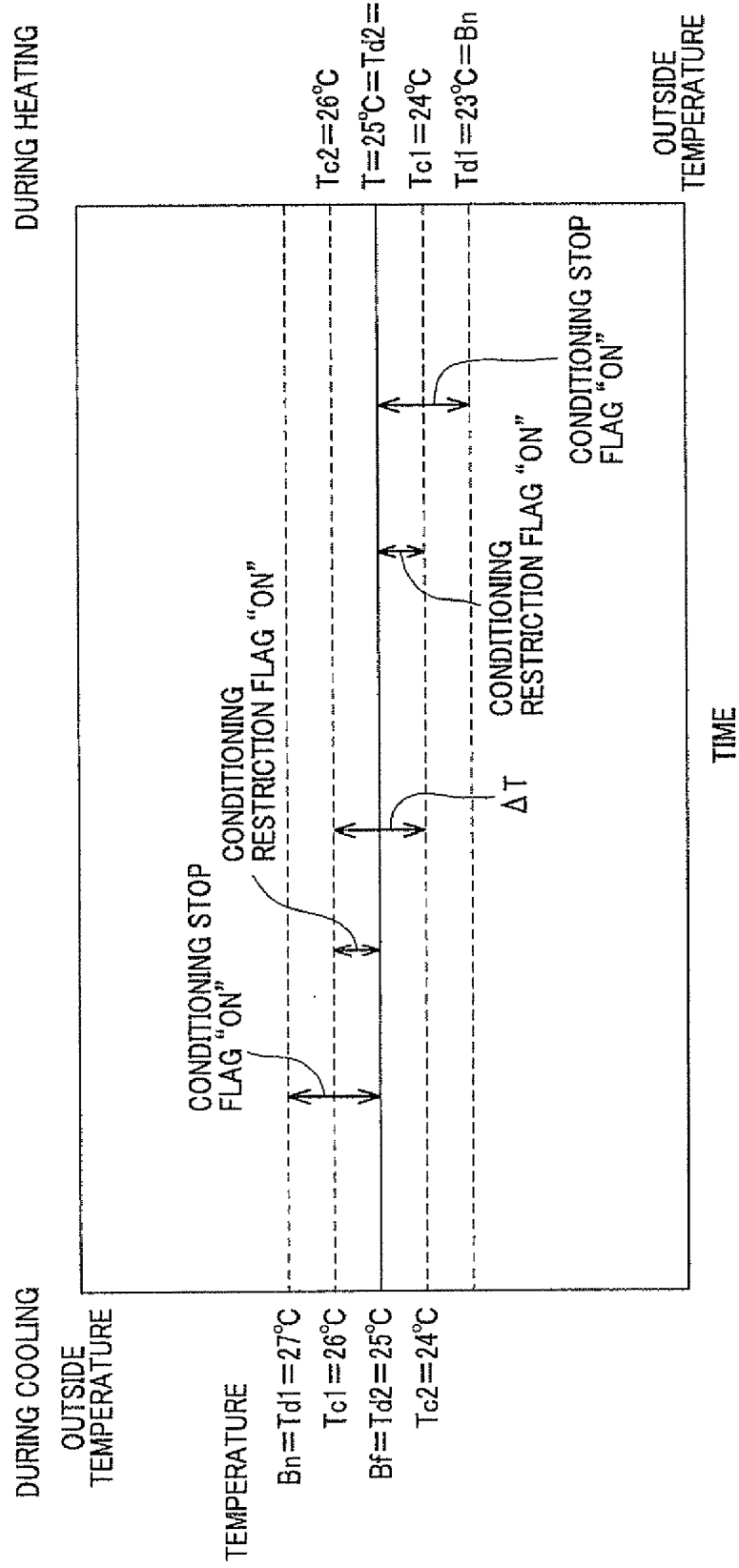
FIG. 22 is a diagram showing an ordinary range of temperature changes when a conditioning stop flag is set to "ON" and a conditioning restriction flag is set to "ON" in the central air-conditioning system according to the second embodiment.

For example, when cooling is performed in the room A with the ordinary set temperature T at 25° C., as shown in FIG. 22, the temperature of the room A is controlled within the ordinary temperature range ΔT from the ordinary outside-temperature-side limit temperature Tc1 of 26° C. to the ordinary counter-outside-temperature-side limit temperature Tc2 of 24° C. In this instance, when the conditioning stop flag for the room A is set to "ON", the boundary value Bn on the side near the outside temperature of the room A becomes the restricted outside-temperature-side limit temperature Td1 of 27° C. The boundary value Bf on the side far from the outside temperature becomes a restricted counter-outside-temperature-side limit temperature Td2. The restricted outside-temperature-side limit temperature Td1 is set to a temperature between the ordinary outside-temperature-side limit temperature Tc1 and the outside temperature. The restricted counter-outside-temperature-side limit temperature Td2 is set to a temperature between the ordinary outside-temperature-side limit temperature Tc1 and the ordinary counter-outside-temperature-side limit temperature Tc2. In the example shown in FIG. 22, the restricted counter-outside-temperature-side limit temperature Td2 is set to the ordinary set temperature of 25° C. Therefore, when the conditioning flag is set to "ON", the boundary value Bf on the side far from the outside temperature of the room A is Bf=Td2=T=25° C. As a result, the temperature of the room A is controlled to a temperature between 27° C. and 25° C., When heating of the room A is performed with the ordinary set temperature T at 25° C., the temperature of the room A is controlled within the ordinary temperature range ΔT from the ordinary outside-temperature-side limit temperature Tc1 of 24° C. to the ordinary counter-outside-temperature-side limit temperature Tc2 of 26° C. In this instance, when the conditioning stop flag for the room A is set to "ON", the boundary value Bn on the side near the outside temperature of the room A is the restricted outside-temperature-side limit temperature Td1 of 23° C. The boundary value Bf on the side far from the outside temperature is the ordinary set temperature T of 25° C. In this instance as well, when Bf=Td2, Td2=25° C. Therefore, the temperature of the room A is controlled between 23° C. and 25° C.

Figure 21:
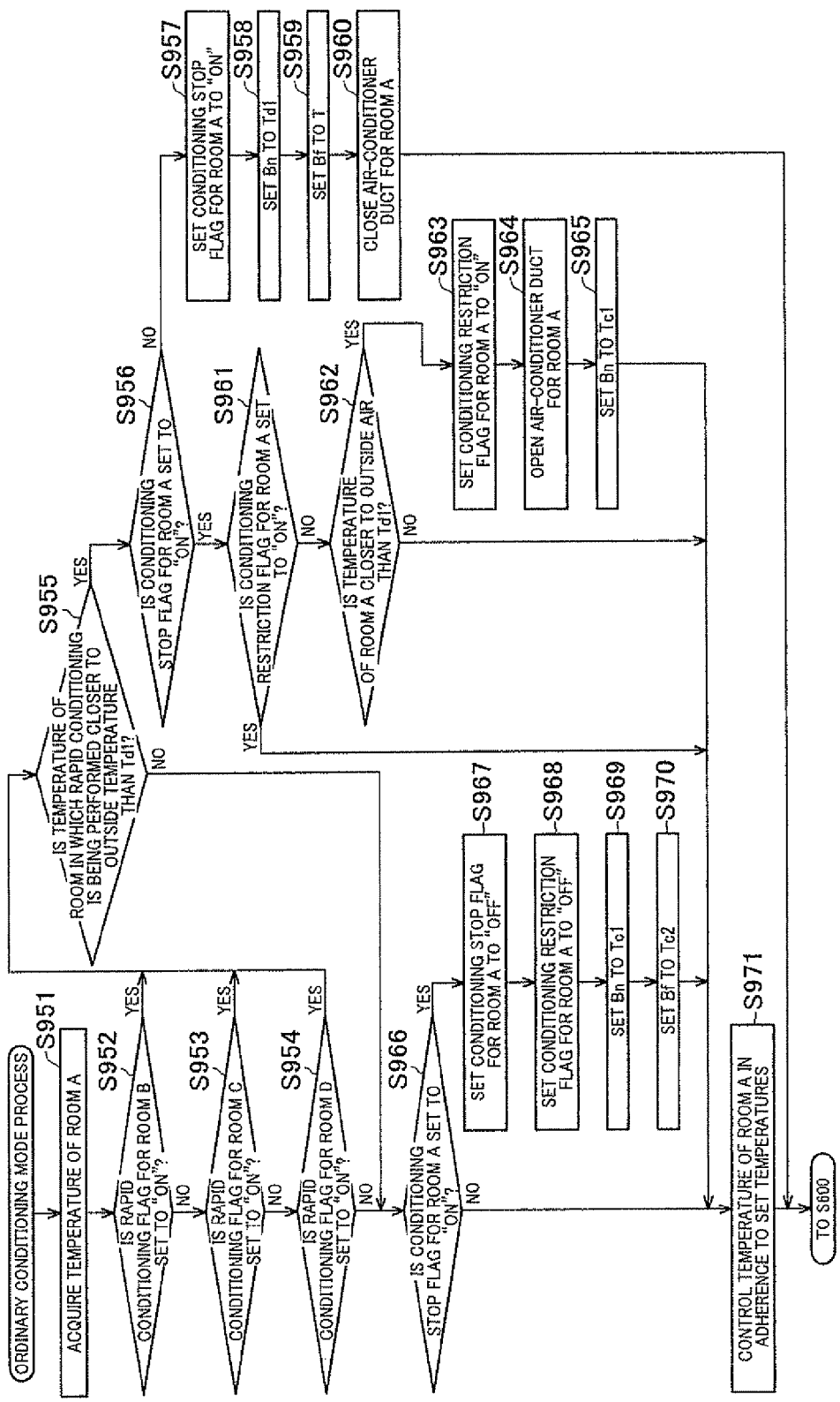
FIG. 21 is a diagram of the flow of an ordinary conditioning mode process for the room A in a central air-conditioning system according to a second embodiment.

When the controller 60 judges that the conditioning stop flag for the room A is set to "ON" at S956 as shown in FIG. 21 (Yes at S956), the controller 60 judges whether a conditioning restriction flag restricting the conditioning performed in the room A is set to "ON" (S961). When the controller 60 judges that the conditioning restriction flag for the room A is set to "OFF" (No at S961), the controller 60 judges whether the temperature of the room A is closer to the outside temperature than the restricted outside-temperature-side limit temperature Td1 (S962). When the conditioning stop flag for the room A is set to "ON" and the conditioning performed in the room A is stopped, as described above, the temperature of the room A reaches the restricted outside-temperature-side limit temperature Td1. When the controller 60 judges that the temperature of the room A is closer to the outside temperature than the restricted outside-temperature-side limit temperature Td1 (Yes at S962), the controller 60 sets the conditioning restriction flag for restricting the conditioning performed in the room A to "ON" (S963). The controller 60 then opens the open/close valve 31 in the air-conditioning duct 21 connected to the room A (S964) and resets the boundary value Bn on the side near the outside temperature of the room A to the ordinary outside-temperature-side limit temperature Tc1 (S965). As a result, the room A is released from a state in which the conditioning is stopped. The temperature of the room A is controlled such that the boundary value Bf on the side far from the outside temperature is the ordinary set temperature T and the boundary value Bn on the side near the outside temperature is the ordinary outside-temperature-side limit temperature Tc1.

For example, when cooling of the room A is performed, when the conditioning restriction flag for the room A is set to "ON", the temperature of the room A is controlled such that the upper limit is the ordinary outside-temperature-side limit temperature Tc1 (26° C.) and the lower limit is the ordinary set temperature T (25° C.). When heating of the room A is performed, when the conditioning restriction flag for the room A is set to "ON", the temperature of the room A is controlled such that the upper limit is the ordinary set temperature T (25° C.) and the lower limit is the ordinary outside-temperature-side limit temperature Tc1 (24° C.).

When the controller 60 judges that the conditioning restriction flag for the room A is set to "ON" (Yes at S961), the temperature of the room A is controlled such that Bf=T and Bn=Tc1. When the controller 60 judges that the temperature of the room A at S962 is farther from the outside temperature than the restricted outside-temperature-side limit temperature Td1 or, in other words, closer to the ordinary set temperature T than the restricted outside-temperature-side limit temperature Td1 (No at S962), the controller 60 continues the state in which the conditioning of the room A is stopped. Therefore, the controller 60 controls the temperature of the room A such that Bf=T and Bn=Td1.

When the rapid conditioning flag for the room B is set to "OFF" (No at S952), when the rapid conditioning flag for the room C is set to "OFF" (No at S953), or when the rapid conditioning flag for the room D is set to "OFF" (No at S954), the controller 60 judges whether the conditioning stop flag for the room A is set to "ON" (S966). When the controller 60 judges that the conditioning stop flag for the room A is set to "ON" (Yes at S966), the controller 60 sets the conditioning stop flag for the room A to "OFF" (S967) and sets the conditioning restriction flag for the room A to "OFF" (S968). In other words, the controller 60 sets the conditioning stop flag and the conditioning restriction flag to "OFF" based on judgment that it is unnecessary to stop conditioning or restrict conditioning in the room A. Furthermore, the controller 60 sets the boundary value Bn on the side near the outside temperature of the room A to the ordinary outside-temperature-side limit temperature Tc1 (S969) and sets the boundary value Bf on the side far from the outside temperature to the ordinary counter-outside-temperature-side limit temperature Tc2 (Step S970). As a result, the control range of the temperature in the room A is once again set to be between the ordinary outside-temperature-side limit temperature Tc1 and the ordinary counter-outside-temperature-side limit temperature Tc2.

When the controller 60 judges that the conditioning restriction flag for the room A is set to "ON" at S961 (Yes at S961), sets the boundary value Bn on the side near the outside temperature of the room A to the ordinary outside-temperature-side limit temperature Tc1 in S965, judges that the temperature of the room A is not closer to the ordinary set temperature T than the restricted outside-temperature-side limit temperature Td1 at S962 (No at S962), sets the boundary value Bf on the side far from the outside temperature of the room A to the ordinary counter-outside-temperature-side limit temperature Tc2 at S970, or judges that the conditioning stop flag for the room A is set to "OFF" at S966 (No at S966), the controller 60 performs ordinary conditioning in the room A in adherence to the upper limit and the lower limit of the temperature set at this point (S971).

Temperature changes that occur during cooling when the above-described ordinary conditioning mode process is performed will be described with reference to FIG. 23 and FIG. 24.

Figure 23:
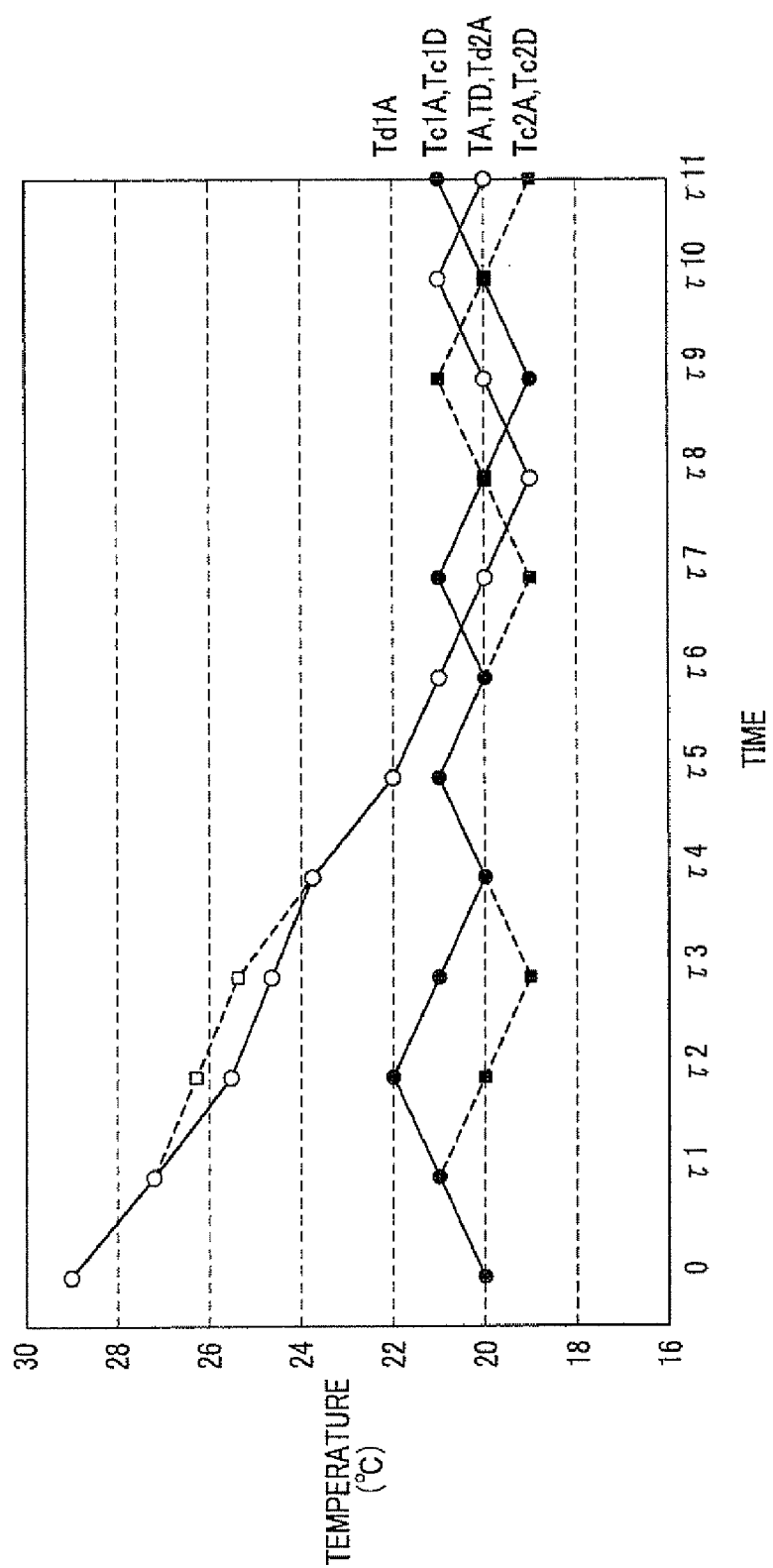
FIG. 23 is a diagram of temperature changes in the room A and the room D in the central air-conditioning system according to the second embodiment.
Figure 24:
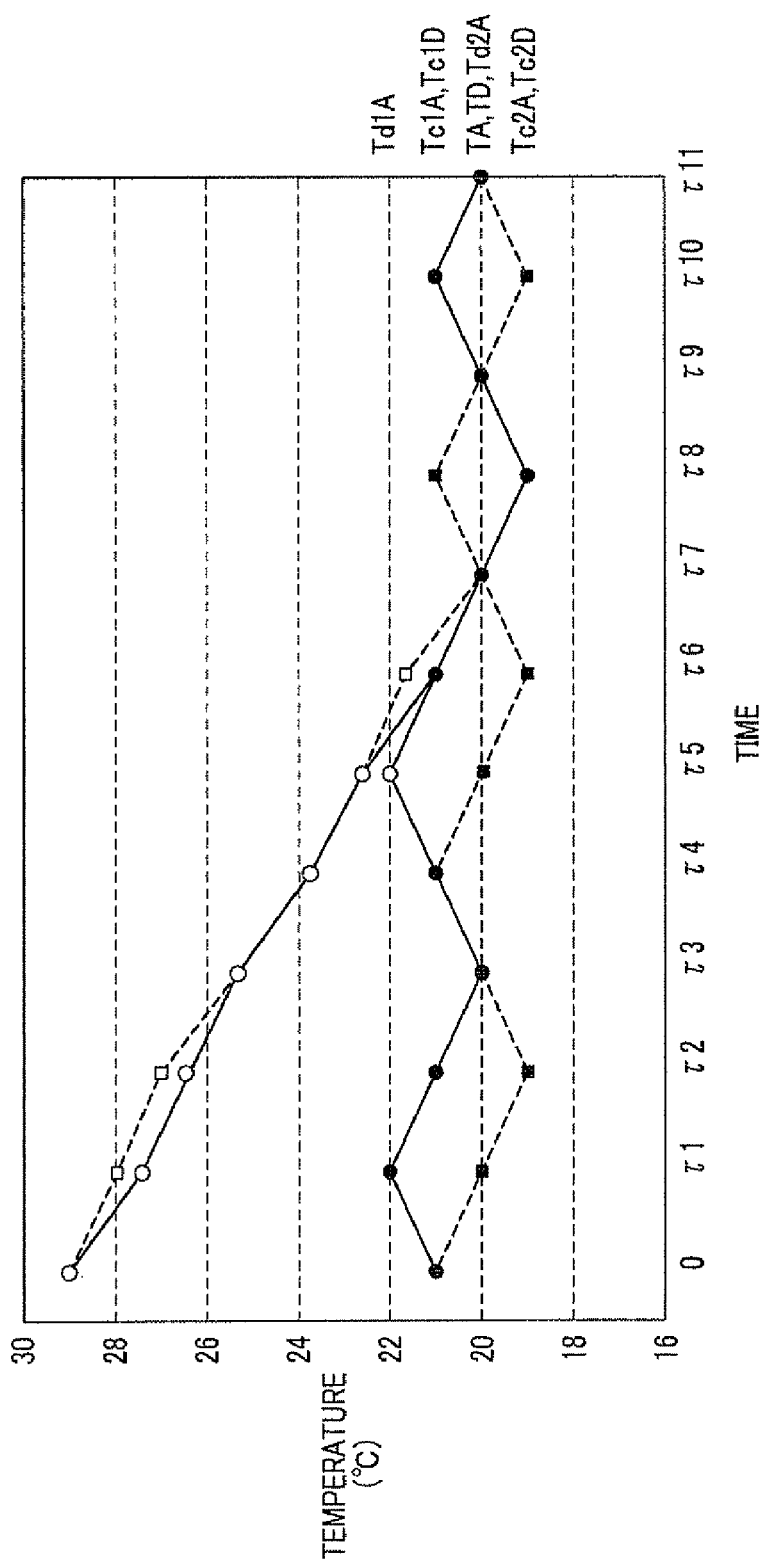
FIG. 24 is a diagram of temperature changes in the room A and the room D in the central air-conditioning system according to the second embodiment.

FIG. 23 and FIG. 24 show examples of temperature changes in the room A and the room D for explaining the above-described control. FIG. 23 shows an example in which the conditioning performed in the room A is turned OFF when the person 70 exits the room A to move to the room D. FIG. 24 shows an example in which the conditioning performed in the room A is turned ON when the person 70 exits the room A to move to the room D. In both examples in FIG. 23 and FIG. 24, the target room is the room A, and the room among the non-target rooms in which rapid conditioning is performed is the room D. Both room A and room D are cooled. The person 70 is present in the room A that is the target room. The temperature of the room A is set such that the ordinary set temperature TA is 20° C., the ordinary outside-temperature-side limit temperature Tc1A is 21° C., and the ordinary counter-outside-temperature-side limit temperature Tc2A is 19° C. The ordinary conditioning mode process is performed in the room A. A restricted outside-temperature-side limit temperature Td1A of the room A is set to 22° C. that is closer to the outside temperature than the ordinary outside-temperature-side limit temperature Tc1A or, in other words, higher than the ordinary outside-temperature-side limit temperature Tc1A. On the other hand, regarding the room D that is the non-target room, the person 70 exits the room A and the operation in the room D changes from energy-saving conditioning mode to rapid conditioning mode, at time τ=0 when the energy-saving temperature tD is 29° C. The temperature of the room D is set such that the ordinary set temperature TD is 20° C., the ordinary outside-temperature-side limit temperature Tc1D is 21° C., and the ordinary counter-outside-temperature-side limit temperature Tc2D is 19° C.

In the example in FIG. 23, at time τ=0, the temperature of the room D is the energy-saving temperature tD of 29° C. The temperature of the room A is the ordinary set temperature TA of 20° C. At this time, when the person 70 exits the room A to move to the room D, the operation in the room D changes to rapid conditioning mode. Therefore, the controller 60 compares the temperature of the room D and Td1A=22° C. of the room A (refer to S955) based on the judgment that the rapid conditioning flag for the room D is set to "ON" (refer to S953). At this time, the temperature 29° C. of the room D is higher than Td1A=22° C. of the room A. Therefore, the controller 60 judges whether the conditioning stop flag for the room A is set to ON (refer to S956). The conditioning stop flag for the room A is not set to "ON" when the person 70 exits the room S at time τ=0. Therefore, controller 60 sets the conditioning stop flag for the room A to "ON" (refer to S957) and changes the boundary value Bn on the side near the outside temperature of the room A to Td1A=22° C. (refer to S958). Furthermore, the controller 60 sets the boundary value Bf on the side far from the outside temperature of the room A to TA=20° C. that is the ordinary set temperature (refer to S959). The controller 60 then stops conditioning the room A and completely closes the open/close valve 31 in the air-conditioner duct 21 connected to the room A. As a result, the cold air generated by the air-conditioning unit 12 is not supplied to the room A and is supplied in a concentrated manner to the room D.

Because the cold air is supplied in a concentrated manner to the room D, the temperature of the room A gradually rises during time τ=0 to time τ2. On the other hand, the temperature in the room D rapidly drops during time τ=0 to time τ2. The gradually rising temperature of the room A reaches the restricted outside-temperature-side limit temperature Td1A of 22° C. for the room A at time τ2. Therefore, the controller 60 opens the open/close valve 31 in the air-conditioner duct 21 connected to the room A and supplies the cold air generated by the air-conditioning unit 12 also to the room A. In other words, the cold air generated by the air-conditioning unit 12 is distributed between the room D being operated in rapid conditioning mode and the room A being operated in ordinary conditioning mode. As a result, the decrease in the temperature of the room D becomes more gradual during time τ2 to time τ4. The temperature of the room A also drops during time τ2 to time τ4.

Here, ordinarily, as indicated by a broken line and the symbol "□" in FIG. 3, the controller 60 controls the temperature of the room A to a temperature between Tc1A=21° C. and Tc2A=19° C. during time τ1 to time τ3. However, when rapid conditioning is being performed in the room D, the lower limit temperature of the room A is TA=Td2A=20° C. and the upper limit temperature is Td1A=22° C. Therefore, even when the temperature of the room A reaches Tc1A=21° C. at time τ1, the controller 60 continues to stop conditioning the room A until the temperature of the room A reaches Td1A=22° C. Then, when the temperature of the room A reaches Td1A=22° C. at time τ2, the controller 60 fully opens the open/close valve 31 in the air-conditioner duct 21 connected to the room A. As a result, the temperature of the room A drops during time τ2 to time τ4. At this time, when the ordinary temperature control is performed in the room A as indicated by the symbol "□", the change in temperature in the room D becomes gradual as indicated by the broken line and the symbol "□" in FIG. 23. However, according to the second embodiment, as a result of the upper limit of the temperature control performed in the room A being set to Td1A=22° C., the cold air supplied to the room A is restricted, and the cold air is supplied sooner to the room D in a concentrated manner. As a result, as indicated by the symbol "□" in FIG. 23, the temperature in the room D drops more quickly compared to when ordinary control indicated by the symbol "□" is performed.

At time τ4, the temperature of the room A drops to TA=20° C. that is the ordinary set temperature. Therefore, when the temperature of the room A reaches TA=20° C. at time τ4, the controller 60 completely closes the open/close valve 31 in the air-conditioner duct 21 connected to the room A. As a result, the temperature of the room A rises once again during time τ4 to time τ5. On the other hand, as a result of the open/close valve 31 in the air-conditioner duct 21 connected to the room A being completely closed, the cold air from the air-conditioning unit 12 is once again supplied to the room D in a concentrated manner during time τ4 to time τ5. Therefore, the temperature of the room D rapidly drops at the same gradient as that during time τ=0 to time τ2.

After time τ5, the temperature of the room D drops below Td1A=22° C. Therefore, the controller 60 resets the temperature control range for the room A to Tc1A=21° C. As a result, the controller 60 controls the temperature of the room A during time τ5 to time τ6 to a temperature between TA=20° C. that is the lower limit and Tc1A=21° C. that is the upper limit. After time τ6, the temperature of the room D drops below the ordinary outside-temperature-side limit temperature Tc1D of 21° C. Therefore, the controller 60 controls the temperature of the room D in ordinary conditioning mode. The controller 60 also controls the temperature of the room A in ordinary conditioning mode.

As a result, the temperature of the room A is controlled between Tc1A=21° C. and Tc2A=19° C. The temperature of the room D is controlled between Tc1D=21° C. and Tc2D=19° C.

As a result of the temperatures of the room A and the room D being targeted as described above, the temperature of the room A exceeds Tc1A=21° C. during time τ1 to time τ3 and reaches Td1A=22° C. at time τ2. However, even when the temperature of the room A exceeds Tc1A=21° C. during time τ1 to time τ3 in this way, the temperature difference is 1° C. Therefore, the person 70 in the room A experiences minimal discomfort. Even when the person 70 experiences discomfort, it is slight and only for a short time. On the other hand, as a result of temperature control in the room A being stopped during time τ1 to time τ3, the room D to which the person 70 who has exited the room A is predicted to enter is rapidly cooled during time τ1 to time τ4. Therefore, the discomfort experienced when entering the room D by the person 70 who exits the room A and enters the room D is reduced. Therefore, the discomfort experienced by the person 70 moving to the room D can be reduced without increasing the discomfort experienced by the person 70 present in the room A.

Next, the example shown in FIG. 24 will be described. In the example in FIG. 24, at time τ=0, the temperature of the room D is the energy-saving temperature tD of 29° C. The temperature of the room A is the ordinary outside-temperature-side limit temperature Tc1A of 21° C. In other words, when the person 70 exits the room A to move to the room D, the temperature of the room A is Tc1A=21° C. in the example in FIG. 24, whereas the temperature of the room A is TA=20° C. in the example in FIG. 23. When the person 70 who moves to the room D exits the room A at time T=0, the operation in the room D changes to rapid conditioning mode. At this time, the temperature 29° C. of the room D is higher than Td1A=22° C. of the room A. Therefore, the controller 60 changes the boundary value Bn on the side near the outside temperature of the room A to Td1A=22° C. Furthermore, the controller 60 sets the boundary value Bf on the side far from the outside temperature of the room A to TA=20° C. that is the ordinary set temperature. At time T=0, the temperature of the room A is Tc1A=21° C. and can rise to Td1A=22° C. that is the boundary value Bn. Therefore, the controller 60 stops conditioning the room A and completely closes the open/close valve 31 in the air-conditioner duct 21 connected to the room A. As a result, the cold air generated by the air-conditioning unit 12 is not supplied to the room A and is supplied in a concentrated manner to the room D.

Because the cold air is supplied in a concentrated manner to the room D, the temperature of the room A gradually rises during time T=0 to time T1. On the other hand, the temperature in the room D rapidly drops during time T=0 to time T1. The gradually rising temperature of the room A reaches the restricted outside-temperature-side limit temperature Td1A of 22° C. for the room A at time T1. Therefore, the controller 60 opens the open/close valve 31 in the air-conditioner duct 21 connected to the room A and supplies the cold air generated by the air-conditioning unit 12 also to the room A. In other words, the cold air generated by the air-conditioning unit 12 is distributed between the room D and the room A. As a result, the decrease in the temperature of the room D becomes more gradual during time T1 to time T3. The temperature of the room A also drops during time T1 to time T3.

Here, ordinarily, as indicated by a broken line and the symbol "□" in FIG. 24, the controller 60 controls the temperature of the room A to a temperature between Tc1A=21° C. and Tc2A=19° C. during time T0 to time T2. However, when rapid conditioning is being performed in the room D, the lower limit temperature of the room A is TA=Td2A=20° C. and the upper limit temperature is Td1A=22° C. Therefore, even when the temperature of the room A is Tc1A=21° C. at time T=0, the controller 60 continues to stop conditioning the room A until the temperature of the room A reaches Td1A=22° C. Then, when the temperature of the room A reaches Td1A=22° C. at time T1, the controller 60 fully opens the open/close valve 31 in the air-conditioner duct 21 connected to the room A. As a result, the temperature of the room A drops during time T1 to time T3. At this time, when the ordinary temperature control is performed in the room A as indicated by the symbol "58 ", the change in temperature in the room D becomes gradual as indicated by the broken line and the symbol "□" in FIG. 24. However, according to the second embodiment, as a result of the upper limit of the temperature control performed in the room A being set to Td1A=22° C., the cold air supplied to the room A is restricted, and the cold air is supplied sooner to the room D in a concentrated manner. As a result, as indicated by the symbol "□" in FIG. 24, the temperature in the room D drops more quickly than when ordinary control indicated by the symbol "□" is performed.

At time T3, the temperature of the room A drops to TA=20° C. that is the ordinary set temperature. Therefore, when the temperature of the room A reaches TA=20° C. at time T3, the controller 60 completely closes the open/close valve 31 in the air-conditioner duct 21 connected to the room A. As a result, the temperature of the room A rises once again during time T3 to time T4. On the other hand, as a result of the open/close valve 31 in the air-conditioner duct 21 connected to the room A being completely closed, the cold air from the to air-conditioning unit 12 is once again supplied to the room D in a concentrated manner during time T3 to time T4. Therefore, the temperature of the room D rapidly rises at the same gradient as that during time T=0 to time T1.

Even after time T4, the temperature of the room D remains higher than Td1A=22° C. Therefore, the controller 60 controls the temperatures of the room A and the room D during T4 to time T6 in a manner similar to that during T=0 to time T1. Therefore, as indicated by the symbol "□", the temperature in the room D drops more quickly compared to the instance indicated by the broken line and the symbol "□" in FIG. 24 corresponding to the ordinary control performed in the room A indicated by the broken line and the symbol "□" in FIG. 24. On the other hand, after time T5, the temperature of the room D drops below Td1A=22° C. As a result, the controller 60 controls the temperature of the room A to a temperature of which the lower limit is TA=20° C. and the upper limit is Tc1A=21° C. from time T6. After time T6, the temperature of the room D drops below the ordinary outside-temperature-side limit temperature Tc1D=21° C. Therefore, the controller 60 controls the temperature of the room D in ordinary conditioning mode. The controller 60 also controls the temperature of the room A in ordinary conditioning mode. As a result, the temperature of the room A is controlled between Tc1A=21° C. and Tc2A=19° C. The temperature of the room D is controlled between Tc1D=21° C. and Tc2D=19° C.

As a result of the temperatures of the room A and the room D being targeted as described above, the temperature of the room A exceeds Tc1A=21° C. during time T0 to time T2 and reaches Td1A=22° C. at time T1. However, even when the temperature of the room A exceeds Tc1A=21° C. during time T=0 to time T2 in this way, the temperature difference is 1° C. Therefore, the person 70 in the room A experiences minimal discomfort. Even when the person 70 experiences discomfort, it is slight and only for a short time. On the other hand, as a result of temperature control in the room A being stopped during time T=0 to time T2 and during time T4 to time T6, the room D to which the person 70 who has exited the room A is predicted to enter is rapidly cooled during time T0 to time T2 and during time T4 to time T6. Therefore, the discomfort experienced when entering the room D by the person 70 who exits the room A and enters the room D is reduced. Therefore, the discomfort experienced by the person 70 moving to the room D can be reduced without increasing the discomfort experienced by the person 70 present in the room A. In particular, the temperature of the room D changes more quickly during time T=0 to time T3 soon after the person 70 exits the room A, compared to when ordinary control is performed. Therefore, when the person 70 enters the room D, the temperature of the room D is sufficiently lowered, and the discomfort experienced by the person 70 entering the room D can be further reduced.

In both the example shown in FIG. 23 and the example shown in FIG. 24, described above, the temperature difference between the ordinary outside-temperature-side limit temperature Tc1A and the restricted outside-temperature-side limit temperature Td1A for the room A is 1° C. It is relatively difficult for the person 70 to sense a temperature difference of several degrees Celsius. Therefore, even when the boundary value on the outside temperature side is increased from the ordinary outside-temperature-side limit temperature Tc1A to the restricted outside-temperature-side limit temperature Td1A in the room A, the person 70 in the room A experiences minimal discomfort. Therefore, the discomfort experienced by the person 70 in the room A can be reduced even when rapid conditioning is performed in the room D. The difference between the ordinary outside-temperature-side limit temperature Tc1A and the restricted outside-temperature-side limit temperature Td1A is not limited to 1° C., and can be set to several degrees Celsius. As described above, it is relatively difficult for the person 70 to sense a temperature difference of several degrees Celsius. Therefore, the present invention can be configured such that the difference between the ordinary outside-temperature-side limit temperature Tc1A and the restricted outside-temperature-side limit temperature Td1A is dynamically changed depending on the current temperature of the room A, the ordinary set temperature of the room A, and the like.

VARIATION EXAMPLE

The second embodiment described above can be changed as follows.

When the ordinary outside-temperature-side limit temperature Tc1 and the restricted outside-temperature-side limit temperature Td1 are similar, or when the ordinary counter-outside-temperature-side limit temperature Tc2 and the restricted counter-outside-temperature-side limit temperature Td2 are similar, the temperature range between the limit temperature on the outside temperature side and the limit temperature on the counter-outside temperature side is set to be the same as the ordinary temperature range ΔT. Then, the restricted counter-outside-temperature-side limit temperature Td2 can be set to a temperature between the ordinary set temperature T and the ordinary counter-outside-temperature-side limit temperature Tc2. In this instance, for example, when the operation in the room D is changed to the rapid conditioning mode, only the first temperature control operation in the room A (such as time τ=0 to time τ3 in FIG. 24) is performed such that the temperature is controlled between the restricted outside-temperature-side limit temperature Td1 and the restricted counter-outside-temperature-side limit temperature Td2. Therefore, when the ordinary outside-temperature-side limit temperature Tc1 and the restricted outside-temperature-side limit temperature Td1, and the ordinary counter-outside-temperature-side limit temperature Tc2 and the restricted counter-outside-temperature-side limit temperature Td2 are similar, rapid conditioning can be performed in the room D that is the non-target room in which rapid conditioning is required to be performed, without causing discomfort in the room A that is the target room.

According to the second embodiment, an example is described in which the restricted counter-outside-temperature-side limit temperature Td2A of the room A that is the target room is set to the ordinary set temperature TA. However, the restricted counter-outside-temperature-side limit temperature Td2A of the room A can be a current temperature TnA of the room A initially detected at S951. In this instance, the restricted outside-temperature-side limit temperature Td1A for the room A is set to a temperature within a range from the Td2A of the room A to the ordinary temperature range ΔT.

For example, the room A is cooled within the ordinary temperature range ΔT=2° C., with the ordinary set temperature TA at 25° C., the ordinary outside-temperature-side limit temperature Tc1A at 26° C., and the ordinary counter-outside-temperature-side limit temperature Tc2A at 24° C. At this time, when the temperature of the room A detected at S951 is TnA=25.5° C., the temperature TnA is set such that TnA=Td2A=25.5° C. In this instance, the restricted outside-temperature-side limit temperature Td1A is set to Ts2A<Td1A≦Td2A+ΔT. In other words, the Td1A of the room A is set such that 25.5° C.<Td1A≦27.5° C.

As a result of Td1A and Td2A being set for the room A as described above, the restricted outside-temperature-side limit temperature Td1A of the room A in which the person 70 is present is within a range that is from the ordinary outside-temperature-side limit temperature Tc1A of 26° C. of the room A to the ordinary temperature range ΔT, even when the restricted outside-temperature-side limit temperature Td1A is near the outside temperature. In other words, during cooling, the temperature of the room A is, at most, merely higher by a few degrees Celsius than the ordinary outside-temperature-side limit temperature Tc1A of 26° C. Therefore, even when rapid conditioning of the room D is being performed, the person 70 present in the room A does not easily sense that the temperature of the room A has exceeded the ordinary outside-temperature-side limit temperature Tc1. Therefore, discomfort in other rooms can be reduced even when rapid conditioning is performed.

Moreover, after the controller 60 starts the temperature comparing process from S957 to S960 in FIG. 21, when the temperature of the room A first reaches Td2A, Td2A can be set between TA and Tc2A. For example, when the temperature of the room A first reaches 25.5° C., Td2A is changed from 25.5° C. to a temperature between TA=25° C. and Tc2A=24° C. As a result, even when rapid conditioning is being performed in the room D, the degree of opening of the open/close valve 31 in the air-conditioner duct 21 connected to the room A is the same as that when ordinary temperature control is performed. Therefore, the frequency of the open/close operation of the open/close valve 31 is not required to be increased. Control can be facilitated.

Third Embodiment

An application example of a person detecting unit will be described as a third embodiment with reference to FIG. 25.

The controller 60 judges the presence the person 70 in each room

A to D, and the entrance and exit of the person 70 into and from each room A to D using the person detecting units 51 to 54, as described according to the above embodiments. The controller 60 can detect a break-in by an intruder using the person detecting units 51 to 54. A specific example will be described below.

(Detection of Break-In by Intruder)

As shown in FIG. 25A, the person detecting units 51 to 54 have seven monitoring areas 71 to 77 along the walls in each room. Among the monitoring areas 71 to 77, the monitoring area 71 and the monitoring area 72 include the window 81. For example, when a resident is not present in the room A, no peak temperature is detected in the seven monitoring areas 71 to 77, as shown in FIG. 25B. On the other hand, when an intruder 100 breaks in from the window 81 as shown in FIG. 25A, the peak temperature detected by the thermopile sensor 91 or the thermopile sensor 92 in the monitoring area 71 or the monitoring area 72 including the window 81, among the seven monitoring areas 71 to 77, rises as shown in FIG. 25C. In this way, when the controller 60 detects the peak temperature in the monitoring area 71 or the monitoring area 72 including the window 81, the controller 60 judges that the intruder 100 who is not a resident has broken into the room A. When the controller 60 detects a break-in by the intruder 100, the controller 60 notifies, for example, a security company using a communication line (not shown).

As described above, through use of the person detecting units 51 to 54, a break-in by an intruder 100 can be monitored in each room without requiring a separate security device.

The house 11 may have a door 83 facing a yard or the like from which the person 70 can enter and exit, as shown in FIG. 26A. In the room A in which the door 83 is located, the person 70 may enter and exit from the door 83. When the person 70 enters and exits from the door 83 while intruder 100 break-in monitoring is being performed as described above, the controller 60 may erroneously identify the person 70 who enters the room A from the door 83 as an intruder. Therefore, when the peak temperature moves from a monitoring area far from the door 83 (such as the monitoring areas 73 to 77) among the monitoring areas 71 to 77 of the room A, as shown in FIG. 26B, to the monitoring area 71 and the monitoring area 72 including the door 83, as shown in FIG. 26C, and subsequently disappears as shown in FIG. 26D, the controller 60 judges that the person 70 has exited outside of the house 11 through the door 83. The controller 60 stores the exit of the person 70 from the room A in, for example, a storage device (not shown). Then, when the peak temperature is detected in the monitoring area 71 corresponding to the door 83 as shown in FIG. 26E, the controller 60 judges that the person 70 has entered the room A through the door 83. At this time, when the exit of the person 70 is stored in the storage device, the controller 60 judges that the person 70 entering once again from the door 83 is a resident. As a result, erroneous identifications of the resident and the intruder can be prevented.

When the person 70 who is a resident exits outside from the room A using the door 83 in this way, the person 70 has exited for a reason, such as to perform housework. Therefore, the possibility is high that the person 70 will soon return to the room A. Therefore, when the person 70 exits outside through the door 83, the controller 60 continues conditioning in ordinary conditioning mode. In other words, when the person 70 exits outside from the door 83, the controller 60 continues operating in ordinary conditioning mode without changing the conditioning mode of the room A to energy-saving conditioning mode. As a result, when the person 70 exits and enters the room A in a short amount of time, frequent switching of the conditioning mode is prevented.

In particular, when the person 70 enters and exits from the door 83, the room A is exposed to the outside air through the door 83. Therefore, the temperature of the room A changes significantly with the opening and closing of the door 83. Therefore, when the person 70 who has exited from the door 83 returns to the room A from the door 83 in a short amount of time, the temperature of the room A changes to a temperature closer to the outside temperature than the ordinary set temperature T by the time the person 70 returns to the room A, when the conditioning mode for the room A is changed to energy-saving conditioning mode or conditioning is stopped when the exit of the person 70 from the door 83 is detected. As a result, the discomfort experienced by the person 70 who has returned to the room A is increased. Therefore, as a result of the conditioning mode being maintained in ordinary conditioning mode when the person 70 enters and exits from the door 83, complicated control accompanying frequent switching of conditioning modes can be reduced. In addition, the discomfort experienced by the person 70 returning to the room A can be reduced.

The present invention described above is not limited to the above-described embodiments. The present invention can be applied to various embodiments without departing from the spirit of the invention.

What is claimed is:
1. A central air-conditioning system comprising:
a single air-conditioning unit that generates heat exchange and outputs air generated by the heat exchange;
a plurality of air-conditioning ducts that connect the air-conditioning system and a plurality of rooms of a house and allows the heat-exchanged air to pass therethrough;
a plurality of open and close valves respectively arranged at each of the air-conditioning ducts to selectively open and close each of the air-conditioning ducts;
a plurality of person detectors respectively arranged in each of the rooms to detect whether or not there is a person in each of the rooms and whether a person enters or exits each of the rooms;
a plurality of temperature sensors respectively arranged in each of the rooms to detect temperature of each of the rooms;
scheduling means that sets hour by hour a temperature control schedule used to control the temperature of each of the rooms at either an ordinary set temperature (T) or an energy-saving temperature (t) lower than the ordinary set temperature; and
a controller that controls the temperature of each of the rooms by selectively opening and closing the open and close valves based on information indicative of both whether or not the person is present in each of the rooms and the temperature of each of the rooms detected by the temperature sensors,
the controller functionally provides
a presence checking process that checks, room by room, whether or not the person is present in the plurality of rooms;
an ordinary conditioning mode process that makes a first flag ON to show that the presence checking process checks that there is a person in a room and controls the temperature of the occupied room in an ordinary temperature range ($\Delta T$) into which the ordinary set temperature (T) falls;
an unoccupied-room process that performs energy-saving conditioning in both an empty room checked by the presence checking process checks such that there is no person in the room and the occupied room whose temperature is already set to the energy-saving temperature (t), the energy-saving conditioning controlling the temperature at the energy-saving temperature (t); and
a rapid conditioning mode transfer process that performs rapid conditioning for the room from the energy-saving temperature (t) to the ordinary set temperature (T),
wherein the controller is configured to control the temperature of a targeted room which is repeatedly assigned to each of the plurality of rooms, during which the controller performs i) a determination process to determine whether or not there is a person in the targeted room, whether or not a person has entered the targeted room, and whether or not a person has exited the targeted room, and ii) the unoccupied-room process when it is determined by the determination process that there is no person in the targeted room,
wherein each of the person detectors is configured to perform the detection by dividing an area of the targeted room into a plurality of monitoring areas, setting at least one of the divided monitoring areas as a doorway area to and from the targeted room, setting, of the divided monitoring areas, and a monitoring area adjacent to the doorway area as an adjacent monitoring area, such that each person detector detects whether or not there is a person in each of the plurality of divided monitoring areas, wherein the determination process is configured to
- determine that a person is present in the targeted room when the person is detected in any of the monitoring areas;
- determine that no person is present in the targeted room when no person is detected in any of the monitoring areas;
- determine that a person has entered the targeted room when the person is detected in the doorway area but not detected in the adjacent monitoring area; and
- determine that a person has exited the targeted room when the person has detected in the adjacent monitoring area and then detected in the doorway area before being not detected in the doorway area, wherein the controller is configured to
- continue to monitor the targeted room until the person exits the room once the determination process determines that the person is present in the targeted room, during which the ordinary conditioning mode process is performed for the targeted room;
- reference the temperature control schedule, which is set for each of rooms being non-targeted other than the targeted room among the plurality of rooms, to determine whether the temperature of a designated non-targeted room among the rooms being non-targeted should be controlled in the ordinary set range T, when the determination process determines that the person has exited the targeted room;
- set a second flag ON to indicate performance of a rapid conditioning mode for the designated non-targeted room when it is determined that the temperature of the designated non-targeted room should be controlled in the ordinary set range T so that the temperature thereof is controlled in the rapid conditioning mode transfer process;
- allows the determination process to monitor entering of a person into the designated non-targeted room after starting the rapid conditioning mode transfer process;
- determine whether or not the second flag for any of remaining rooms being non-targeted except for the designated non-targeted room is ON when it is determined that the person has entered the designated non-targeted room; and
- set the second flag OFF for each of the remaining rooms being non-targeted when the second flag for the remaining rooms being non-targeted is ON and a person is not detected in the remaining rooms being non-targeted, the OFF setting of the second flag allows the unoccupied-room process in the remaining non-targeted rooms to occur.

2. The central air-conditioning system of claim 1, wherein
- each of the person detectors is equipped with an infrared radiation sensor sensing a peak temperature in each of the plurality of monitoring areas which are set in each of the rooms, and
- the controller includes means for determining whether or not to there is a person in each of the targeted room and determining whether or not a person has entered or exited the targeted room, by using information indicative of the peak temperature detected by the infrared radiation sensor in each of the monitoring areas.

* * * * *